United States Patent [19]
Bigham et al.

[11] Patent Number: 5,544,161
[45] Date of Patent: Aug. 6, 1996

[54] ATM PACKET DEMULTIPLEXER FOR USE IN FULL SERVICE NETWORK HAVING DISTRIBUTED ARCHITECTURE

[75] Inventors: John A. Bigham, Pottstown, Pa.; Kamran Sistanizadeh, Arlington, Va.; Dave Little, Columbia, Md.

[73] Assignee: Bell Atlantic Network Services, Inc., Arlington, Va.

[21] Appl. No.: 413,207

[22] Filed: Mar. 28, 1995

[51] Int. Cl.⁶ ........................................ H04J 3/24
[52] U.S. Cl. .................. 370/58.1; 370/60; 370/60.1; 370/94.1; 348/6; 348/7; 348/12
[58] Field of Search ...................... 370/60.1, 60, 94.1, 370/58.1; 455/4.2, 5.1; 380/20, 10; 348/10, 12, 8, 6

[56] References Cited

U.S. PATENT DOCUMENTS

| | | | |
|---|---|---|---|
| 4,461,032 | 7/1984 | Skerlos | 380/10 |
| 4,623,920 | 11/1986 | Dufresne et al. | 380/20 |
| 4,987,486 | 1/1991 | Johnson et al. | 358/86 |
| 5,067,123 | 11/1991 | Hyodo et al. | 370/58.1 |
| 5,136,411 | 8/1992 | Paik et al. | 359/125 |
| 5,220,420 | 6/1993 | Hoarty et al. | 348/12 |
| 5,231,494 | 7/1993 | Wachob | 348/385 |
| 5,247,347 | 9/1993 | Litteral et al. | 348/7 |
| 5,387,927 | 2/1995 | Look et al. | 348/6 |
| 5,426,699 | 6/1995 | Wunderlich et al. | 380/20 |

*Primary Examiner*—Melvin Marcelo
*Assistant Examiner*—Melissa Kay Carman
*Attorney, Agent, or Firm*—Lowe, Price, LeBlanc & Becker

[57] ABSTRACT

A video distribution network having an architecture that distributes video services over a greater serving area. The broadcast consolidation section receives broadband data from a plurality of information providers, preferably as compressed, digital signals using asynchronous transfer mode (ATM) transport. The broadcast consolidation section combines the ATM streams from different information providers and outputs a consolidated signal onto a transport ring. The broadcast ring supplies the consolidated broadcast edit to a plurality of video network hubs, each of which downloads the consolidated broadcast data, converts the consolidated broadcast data to MPEG data on an RF carrier, and combines the RF signal with other RF signals before transmission by optical fiber to a plurality of local video access node. Each local video access node combines the RF broadcast data from the corresponding video access node with downstream IMTV traffic supplied by an ATM backbone subnetwork. The combined RF signals are output from the local video access nodes to the access of network servicing these subscribers. ATM demultiplexers in the video network hubs and the local video access nodes perform MPEG processing on received ATM cell streams, assign identification values, and output on broadband channels or narrowband signaling channels, on the basis of corresponding VPI/VCI values and downloaded routing information, resulting in efficient transport of signaling traffic and interactive data.

51 Claims, 9 Drawing Sheets

5,544,161

ATM PACKET DEMULTIPLEXER FOR USE IN FULL SERVICE NETWORK HAVING DISTRIBUTED ARCHITECTURE

TECHNICAL FIELD

The present invention relates to full service digital broadband networks offering a full range of digital communications by transporting compressed, digital information using Asynchronous Transfer Mode (ATM) backbone transport and RF distribution over a hybrid-fiber-coax local loop distribution.

BACKGROUND ART

Distribution of full motion video data has evolved from early television broadcasting to meet viewer demand. Recently, several different wideband digital distribution networks have been proposed for offering subscribers an array of video services; including true Video On Demand service. The following U.S. Patents disclose representative examples of such digital video distributions networks: Yurt et al. U.S. Pat. No. 5,253,275, Yurt et al. U.S. Pat. No. 5,132,992, Ballantyne et al. U.S. Pat. No. 5,133,079, Tindell et al. U.S. Pat. No. 5,130,792, Lang U.S. Pat. No. 5,057,932, Lang U.S. Pat. No. 4,963,995, Cohen U.S. Pat. No. 4,949,187, Baji et al. U.S. Pat. No. 5,027,400, and Walter U.S. Pat. No. 4,506,387. For example, Litteral et al. U.S. Pat. No. 5,247,347 discloses a digital video distribution network providing subscribers with access to multiple Video On Demand service providers through the public switched telephone network.

The prior art video networks have not addressed many problems which arise when the networks must be adapted to provide end users with equal access to multiple video information providers. The networks of the prior art also typically have not been designed to accommodate a full range of digital services such as telephone, video, video-on-demand, data services, information services, interactive services, and other modern digital offerings.

A disadvantage of systems such as that of Litteral et al., which use the PSTN as a video distribution system is that they are often bandwidth limited. Because the systems use the PSTN only for connectivity between subscribers and/or between subscribers and Video Information Providers (VIPs), there is no capability for dynamic routing of digitized video without requiring dedicated leased, wide bandwidth circuits. Also, point-to-point connectivity makes it difficult to offer a wide array of broadcast services such as are now widely available through existing CATV systems.

Attempts have been made to improve the core switching, multiplexing and transmission technologies for integrated digital networks to support voice, data and video services from VIPs for multiple users. For example, fiber optic transmission systems with bandwidths ranging from 155.52 to 2,488.32 Mbps have been considered to improve bandwidth access. In addition, asynchronous transfer mode (ATM) has been developed as a technique to provide broadbandwidth, low delay, packet-like switching and multiplexing. In ATM, usable capacity can be assigned dynamically (on demand) by allocating bandwidth capacity to supply fixed-sized information-bearing units called "cells" to point-to-point or multi-point outputs. Each cell contains header and information fields. The ATM standard, CCITT.121/2 specifies a 53 byte cell which includes a 5 byte header and a 48 byte payload.

MPEG (moving picture experts group) is a broad generic standard for digital video program compression. A number of specific compression algorithms satisfy MPEG requirements. MPEG-2 is a second generation compression standard capable of encoding video program material into a 6 Mbits/sec bit stream and packetizing a number of 6 Mbits/sec channel streams into a single higher rate signal transport stream. The conversion of MPEG-2 data into ATM cell format, however, imposes additional overhead requirements that reduce the information-carrying capacity of the network. For example, synchronous transmission protocols, such as SONET, may require a stream of continuous data to retain synchronization. Thus, an ATM data stream carrying MPEG video data that is transmitted on a synchronous carrier may need to be padded with ATM idle cells, or "dummy cells", in order to ensure proper synchronization with the physical layer. Therefore, the network's information-carrying efficiency is reduced each time information data is converted to another layer of transport protocol.

In addition, there has been a growth of VIPs offering video services to subscribers. The growth in the number of VIPs offering services will result in capacity problems on the PSTN connecting the VIP services to their subscribers. In addition, any one VIP may not fully utilize the physical connection to the PSTN when providing video services. Thus, if a plurality of VIPs each use an assigned optical fiber at, for example, fifty percent capacity, the PSTN will be inefficiently utilized if the optical fiber of each VIP is connected to the PSTN internal switches. Thus, a need exists for increased bandwidth and efficient connectivity techniques in the PSTN as competition increases between VIPs for connectivity to subscribers.

An example of a video network utilizing a Level 1 Gateway is disclosed in commonly-assigned copending application Ser. No. 08/304,174, filed Sep. 12, 1994 (attorney docket No. 680-093), the disclosure of which is incorporated herein in its entirety by reference. FIG. 1 corresponds generally to FIG. 4 of this commonly-assigned copending application and discloses a hybrid fiber-coax system which provides RF transport of both analog and digital broadband services. The illustrated network provides broadcast video distribution, archival video services and interactive multi-media services as well as plain old telephone service.

The network of FIG. 1 includes a Loop Transport Interface 10 located in a telco central office. In an area serviced through multiple central offices, several different central offices would each have a Loop Transport Interface similar in structure to the Interface 10 depicted in FIG. 1. In some respects, each Loop Transport Interface serves as the head-end of an otherwise conventional optical fiber trunk and coaxial cable type CATV distribution network.

In the Loop Transport Interface 10, a laser type optical transmitter 12 transmits downstream signals through fibers 14 to optical to electrical nodes referred to as "optical network units" or ONU's. The laser operates in a linear mode in the range of 5–750 MHz. The transmitter 12 is followed by an optical splitter and can transmit to several ONU nodes 16. Each ONU 16 performs optical to electrical conversion on the downstream signals and supplies downstream RF electrical signals to a coaxial cable distribution system 18.

The optical transmitter receives and transmits signals from an RF (radio frequency) combiner 20. The combiner 20 combines levelized RF signals from several sources to produce the appropriate signal spectrum for driving the optical transmitter 12. One set of signals supplied to the RF combiner 20 are group of AM-VSB (amplitude modulated vestigial sideband) analog television signals 22 from one or more appropriate sources (not shown). Such signals are essentially "in-the-clear" CATV type broadcast signals capable of reception by any subscriber's cable ready television set.

The analog television signals are broadcast from the optical transmitter 12 through the tree and branch optical and coax distribution network to provide "basic" CATV type service to all subscribers on the network. In order to obtain additional network services as discussed below, the subscriber may obtain a digital entertainment (DET) 24. A network interface module in the DET 24 includes a tuner that permits subscribers to the digital services to receive the analog broadcast channels through the same equipment used for the digital services.

The network depicted in FIG. 1 also provides transport for digitized and compressed audio/video programming, both for certain broadcast services and for interactive services, such as video on demand. The network uses a video compression called Motion Picture Experts Group (MPEG). The MPEG encoded video is transported to each Loop Transport Interface using asynchronous transfer mode (ATM) transport and switching.

In the illustrated network, digital broadcast service signals 26 in MPEG encoded form and arranged in ATM cell packets are applied to an ATM packet demultiplexer 28 in the Loop Transport Interface 10. These broadcast service signals 26 originate in one or more broadcast VIP's ATM encoders controlled by the VIP servers. The ATM broadcast services carry premium service type programming. For certain interactive services which utilize one digitized channel to provide limited downstream transport to a large number of subscribers, the ATM broadcast cell stream signals originate from a server 30. Fully interactive broadband digital signals, in MPEG-ATM format, are also applied to the ATM packet demultiplexer 28 from an ATM switch 32. The ATM packet demultiplexer 28 terminates all ATM cell transport through the network, and converts the cell payload information into a plurality of MPEG-2 format bit streams.

In addition to the analog broadcast signals, the RF combiner 20 receives a variety of other analog RF signals from a group of RF digital modulators 34 that output the MPEG streams from the ATM packet demultiplexer 28 as digital broadband information in RF analog format. Each RF modulator 34 outputs a 6 MHz bandwidth IF signal which an upconverter (not shown) tunes to a different RF channel having a corresponding carrier frequency. A network data processor (NDP) 38 uses the VPI/VCI header from the ATM cells to control the ATM packet demultiplexer 28 to route the MPEG bit streams to the appropriate digital RF modulator 34. The NDP 38 provides the control information to the ATM packet demultiplexer 28, for example, by an ethernet bus 38a. The Ethernet bus 38a is also coupled to the network controller 36, the ACC 4000D 46, and the video manager 50. Thus, the video manager 50 and the ACC 4000 46 can provide control data for use by the ATM packet demultiplexer.

The RF modulators 34 use 64 QAM (quadrature amplitude modulation) or 16 VSB (vestigial sideband) modulation techniques. The 64 QAM is used to modulate 4 channels of 6 Mbits/s MPEG encoded digital video information into one 6 MHz bandwidth analog channel. Similarly, 16 VSB modulates 6 channels of 6 Mbits/s MPEG encoded digital video information into one 6 MHz bandwidth analog channel. As another example, U.S. Pat. No. 5,231,494 to Wachob, the disclosure of which is incorporated herein in its entirety by reference, teaches quadrature phase shift keyed (QPSK) modulation of a plurality of video, audio and data signals into a single data stream within a standard six MHz channel allocation for transmission over a CATV type distribution network.

The 6 MHz bandwidth RF signals from the modulators 34 are supplied to the optical transmitter 12 for downstream transmission together in a combined spectrum with the AM-VSB analog television signals 22. The downstream transport of the digital programming is an RF transmission essentially the same as for the analog basic service channels, but each of the channels from the RF modulators 34 contains 4 or 6 digitized and compressed video program channels, referred to hereinafter as "slots". The 6 Mhz digital program channels are carried through the fiber and coaxial system in standard CATV channels not used by the analog basic service programming. The ONU 16 is essentially transparent to both the analog basic service channels and the channels carrying the digital programming and supplies all of the signals as a combined broadcast over the coaxial cable network 18.

At the subscriber premises, a network interface module (NIM) (not shown) couples the set-top device or digital entertainment terminal (DET) 24 to a drop cable of the coaxial distribution network 18. In this network configuration, the NIM includes an analog frequency tuner controlled by a microprocessor to selectively receive the RF channel signals, including those channels carrying digital information. The NIM also includes a QPSK, QAM or VSB demodulator to demodulate a selected one of the digitized program signals carried in one of the digital slots within a received 6 MHz channel and performs a forward error correction function on the demodulated data. A digital audio/video signal processor within the DET decompresses received video signals, generates graphics display information and performs digital to analog conversion to produce output signals compatible with a conventional television set 40.

The analog tuner in the NIM tunes in all channel frequencies carried by the network, including those used for the analog broadcast services. The DET 24 includes a bypass switch in the NIM and an analog demodulator to selectively supply analog signals from the basic service channels directly to the audio/video output terminals or to the modulator, to provide signals to drive a standard television receiver.

The DET 24 also includes a remote control and/or keypad to receive various selection signals from a user. The DET relays data signals upstream over a QPSK signaling channel on the coaxial cable to the ONU 16 in response to user inputs such as selection of a pay per view event. The actual transmission of any such data signals upstream from the DET 24 occurs in response to a polling of the DET. The ONU 16 combines upstream data signals from the DET's serviced thereby and transmits those signals upstream over another optical fiber 42 to an optical receiver 44 in the Loop Transport Interface 10. Each DET 24 may transmit data on a different carrier frequency or timeslot, in which case the network controller 36 knows which DET sent particular data based on the received frequency channel. Alternatively, for interactive services, the DET may transmit a unique identification code with the upstream message.

In the implementation of the network illustrated in FIG. 1, an ACC 4000D 46 performs set top management and specific program access control functions. Service profiles for each customer on the network and their DET's are set up and stored within the ACC 4000D 46. The ACC 4000D 46 may also provide an interface to appropriate billing systems (not shown) for some broadcast services, such as pay per view. For ATM broadcast services, when a subscriber first signs up, a portfolio of channels subscribed to by that customer is established in the subscriber's profile data within the ACC 4000D 46. Based on this profile data, the ACC 4000D 46 downloads a service map into the subscriber's DET 24. The downstream transmission portion of the network provides an out-of-band downstream signalling channel to the DET's using internet protocol (IP) addressing. For example, for the downloading of the service map information from the ACC 4000D 46 to each DET 24, the ACC 4000D 46 outputs the service map information to the network data processor (NDP) 38 via the Ethernet 38a. The NDP includes a QPSK modulator for modulating the service map information onto the out-of-band downstream signaling channel. The modulated signals are then output to the RF combiner 20. At the subscriber site, the subscribers' DET/NIM would recognize, capture and process the out-of-band signaling data based on the corresponding IP address. This downstream signaling channel also carries signals for controlling software downloading and/or selection of certain channels or frames for decoding in interactive services.

All digital broadcast service signals are broadcast into each subscriber's premises, and each DET 24 includes means for receiving and decoding each such digital broadcast service channel, which may include premium channels. The microprocessor in the DET 24 controls access to any of these channels based on the downloaded map information stored in the system memory. For example, if one subscriber requests HBO, and that subscriber has paid to subscribe to HBO, the subscriber's DET 24 contains map information instructing it to tune to the RF channel and select and decode the digital program slot carrying HBO for display on the subscriber's television set 40. However, if a requesting subscriber has not paid for HBO, the downloaded service map will not provide the requisite data for tuning and decoding of that channel. If a decryption key is needed, the Level Gateway 48 instructs the video manager 50 to instruct the ACC 4000D 46 to transmit the key to subscriber's DET 24.

The implementation of the network illustrated in FIG. 1 also provides telephone service. Between the optical network unit and the subscriber premises, the 700–750 MHz portion of the spectrum on the coaxial cable carries the telephone signals. This allocated spectrum provides transport for 24 DS0 telephone channels. Each subscriber premises has telephone interface referred to as a Cable Network Unit (CNU) 52 coupled to the coaxial cable which serves to couple two-way signals between a twisted wire pair into the home and the telephone frequency channels on the coaxial cable 18. Upstream telephone signals are applied from the optical receiver 44 to a host digital terminal (HDT) 54 which provides an interface to a standard digital telephone switch 56. Downstream telephone signals from the switch 56 pass through the HDT 54 to the RF combiner 20 for transmission in the 700–750 MHz frequency range over the fiber to the ONU 16 and the coaxial cable distribution system 18. Upstream telephone signals are output in the 5–40 MHz frequency range of the coaxial cable, which are block converted in the fiber nodes for transport on an optical fiber.

The implementation of the network illustrated in FIG. 1 also offers access to video information providers (VIP's) for interactive broadband services, such as video on demand.

For archival services and many other interactive services, each VIP has a level 2 gateway and some form of broadband information file server 403. The ATM switch 32 provides communications links between the Loop Transport Interfaces 10 and the level 2 gateways and file servers 60. Customer access to the VIP's is controlled through one or possibly more programmed computer or processor elements performing the processing functions of the Level 1 Gateway 48. A permanent virtual circuit (PVC) controller 57 and a video manager 50 respond to signals from the Level 1 Gateway to control the point to point routing through the network.

The PVC controller 57 stores data tables defining all possible virtual circuits through the ATM switch 32 and the Loop Transport Interface 10 serving each DET terminal of a customer subscribing to each particular provider's services. These data tables define the header information and the switch port to the packet handlers needed to route cells to the correct Loop Transport Interface. The video manager 50 stores similar data tables identifying the transmission fiber ports, RF channels and multiplexed digital channel slots which may be used to transport each data stream processed by the ATM packet demultiplexer 28 through the fiber 14 to the appropriate ONU 16 serving each DET. The data tables in the PVC controller 57 and the video manager 50 thus define "permanent virtual circuits" between the VIP's equipment 403 and the DET's 24.

For a full, broadband interactive session, the subscriber operates the DET 24 to interact with the Level 1 Gateway 48 and select a VIP. The PVC controller 57 responds to instructions from the Level 1 Gateway by activating the ATM switch 32 to establish a downstream virtual circuit path between a port of the VIP's server and the ATM packet demultiplexer 28 within the Loop Transport Interface 10 servicing a subscriber requesting a call connection to the particular VIP. The video manager 50 assigns a particular one of the digitized video channel slots in a digital program type RF channel to carry the particular point to point communication. Specifically, the video manager controls the ATM packet demultiplexer 28 to route MPEG data recovered from the ATM cells for the particular point to point communication to the port for one of the RF modulators 34 so that the modulator will include the MPEG data in the assigned digital channel slot within a particular 6 MHz RF channel. The video manager 50 also transmits a signal downstream through the signaling channel to the subscriber's DET 24 instructing the DET to tune to the particular RF channel and decode MPEG data from the specifically assigned digital channel within that RF channel. Similar dynamic assignments of RF channels on a CATV system to individual terminals for interactive services are disclosed in U.S. Pat. No. 5,220,420 to Hoarty et al. and U.S. Pat. No. 5,136,411 to Paik et al., the disclosures of which are incorporated herein in the entirety by reference.

Concurrently, the Level 1 Gateway 48 would instruct the PVC controller 57 to control the ATM switch 32 to establish an upstream virtual circuit for control signals sent from the DET 24. In such a case, the upstream signals from the DET are passed up through the fiber-coax network and receiver 44 to the network controller 36, and then the VIP's level 2, gateway via the ATM switch 32.

While the network disclosed in FIG. 1 is able to provide broadcast video and interactive video services to video subscribers, the overall architecture is limited in that the loop transport interface 10 is able to service only a limited number of living units, for example approximately 2,000. Thus, if it is desired that full-service digital broadband video services are to be provided to a greater population, a substantial expenditure must be invested to install additional loop transport interfaces throughout proposed video service areas. Since the costs for installing and implementing the additional loop transport interfaces 10 may be substantial, a network provider may be hesitant to invest substantial capital for new equipment necessary for the additional loop transport interfaces if the new subscribers in the proposed video service areas are willing to pay only a limited amount of subscriber fees.

In addition, the network disclosed in FIG. 1 requires a substantial amount of control processing and connectivity with the video information providers and the corresponding servers 60. If additional loop transport interfaces 10 are to be added to proposed service areas, the VIPs may be required to communicate with multiple level 1 gateway controllers 48 from the different service areas, creating additional difficulties in management and service processing for the VIPs.

The network disclosed is FIG. 1 also has limited flexibility in that the ATM packet demultiplexer 28 recovers MPEG data having preassigned PID values from the ATM cell streams. It would be desirable to provide an ATM packet demultiplexer that provides additional flexibility in MPEG encoding to enable dynamic MPEG encoding of ATM cell streams.

The ATM packet demultiplexer 28 also is limited in that the ATM cell streams generally must include MPEG-encoded data streams before transmission through the network. It would be desirable to provide an arrangement that did not necessarily require MPEG-encoded data in the ATM cells transported to the loop transport interface 10, but that was adapted to accept ATM cells carrying different data formats.

Finally, the network disclosed in FIG. 1 involves IP addressing using TCPIP protocol; this technique, however, results in additional IP address management at the VIP and each DET, as well as additional IP processing at the DET. It is anticipated that the increased popularity of Internet will result in revision in protocol standards to accommodate increased IP address lengths, thereby increasing overhead and reducing available bandwidth on the network for data transmission. Further, the network disclosed in FIG. 1 requires different data paths for video data and signaling data, thereby complicating data transport to the DET. It would be desirable to provide a flexible, efficient signaling communication system that precisely described the efficient transport of signaling information to individual DET's.

DISCLOSURE OF THE INVENTION

A principal object of the present invention is to provide a seamless, smooth approach for connecting a video information user (VIU) to the video information provider (VIP) of their choice, in a multiple provider environment. The connection to the VIP of choice must be provided in a non-discriminatory manner that enables the user to easily access that particular provider. The network must have the capability to selectively connect the VIU to broadcast services and to IMTV services.

Another objective is to provide an improved distributed network architecture that distributes video services over a greater serving area, while at the same time maintaining flexibility for VIPs to provide broadcast IMTV and point-to-point video services and that maximizes use of shared network resources.

The present invention includes an ATM packet demultiplexer for providing flexible MPEG addressing of incoming data streams, such as ATM cell streams or data signaling messages. For example, the ATM packet demultiplexer is adapted to apply specified PID values to MPEG streams for transmission to either a single VIU or a group of VIU's, based on the VPI/VCI value of the incoming ATM cell stream; thus, the ATM packet demultiplexer is effective for providing MPEG-encoded data for broadcast or IMTV sessions. In addition, the ATM packet demultiplexer is able to encode non-video data, such as operating system code, encryption keys, or signaling data, into MPEG packets having a specific PID value for a VIU. Since the non-video data may be supplied to a video end office by an ATM stream source, such as an ATM backbone subnetwork, the ATM packet demultiplexer is able to receive video and non-video data such as signaling data from a high-bandwidth ATM stream source or a low-bandwidth source. Regardless of the source, the demultiplexer can selectively output the MPEG-encoded data on either an in-band channel or an out-of-band channel. Thus, the ATM packet demultiplexer, also referred to as an MPEG packet router, is able to route any necessary data to a VIU based on a specified connection block descriptor and PID value.

The ATM packet demultiplexer of the present invention is implemented in a video distribution network having an architecture that is designed for flexible implementation, expandability, and efficient resource management to optimize economies of scale. Although the disclosed network can be implemented in a small-scale service area, the expandability and distributed architecture of the network enables signal processing costs to be distributed over a larger serving area, thereby enabling network providers to provide video services at lower costs to subscribers.

The network is designed for centralized control of network services and interfaces between video information providers (VIPs) and video information users (VIUs), while at the same time providing flexible signaling and transport of control signals and video data. The VIPs are able to communicate with the centralized control of the network for VIU account management, event scheduling, and for traffic management (bandwidth assignments, data transport paths, etc.). The network manages both point-to-multipoint (broadcast) and point-to-point (interactive) sessions with minimal overhead required by the VIP.

The ATM packet demultiplexer, as used in the network of the present invention also is adapted to transport broadband data to and from the VIP to a VIU, independent of the data format or the hardware of the network users. The term "network users" generally refers to both VIPs and VIUs. Thus, the use of the ATM packet demultiplexer of the present invention enables the disclosed network to accommodate different access technologies and hardware specifications that may be used by the video information providers, as well as the video information users. In addition, the network is adapted to transport broadband data that may be types other than video; thus, the network is adapted to transport any type of data that satisfies the interface requirements of the network, thereby enabling transport of interactive multimedia services from sources such as, for example, Internet. As such, the network of the present invention provides network interfaces designed to serve as generic interfaces, thereby providing maximum flexibility for the network users.

The network of the present invention has a distributed architecture to service a number of local serving areas with a minimum of hardware or signal processing. According to a preferred embodiment of the present invention, the network includes a broadcast consolidation section, a broadcast ring, a plurality of video network hubs, a plurality of video end offices, and an ATM backbone subnetwork. These components of the network provide an architecture that provides both distributed services and flexibility for providing service as well as expandability.

The network broadcast consolidation section serves as a network interface for broadcast video information providers. The network interface is adapted to accept baseband analog video as well as digital video. The broadcast consolidation section combines the broadcast data from the VIPs and outputs the consolidated broadcast data on a unidirectional broadcast ring. The broadcast ring supplies the consolidated broadcast data to a plurality of video network hubs (VNH) coupled to the broadcast ring, also referred to as video access nodes (VAN).

Each of the video network hubs serviced by the broadcast ring downloads the consolidated broadcast data from the broadcast ring, converts the consolidated broadcast data to MPEG data on an RF carrier, and combines the RF signal with other RF signals (such as over-the-air broadcast signals or public access channel TV) before transmission by optical fiber. Each video network hub outputs the combined RF signals to a corresponding plurality of video end offices, also referred to as local video access nodes (LVAN). The video end offices receive the combined RF signals from the corresponding video network hub, combine the received RF signals with point-to-point downstream traffic from the ATM backbone subnetwork, and output the combined RF signals to the access subnetwork servicing the subscribers, such as a hybrid-fiber-coax loop distribution system.

The network includes an ATM backbone subnetwork designed to provide transport for all control and signaling traffic throughout the network, as well as transport for any data for point-to-point communications from an appropriate source to the video end office serving a subscriber requesting a session with the particular source. Thus, not only does the ATM backbone subnetwork provide signaling information between the Level 1 gateway, the network control center and the corresponding video network hubs and video end offices, but it also provides the point of interconnection for VIPs for IMTV sessions with VIUs.

Thus, the present invention provides a broadband data network that provides centralized control and signal processing with distributed data transport to provide broadband data services to a greater number of subscribers at a greater level of efficiency for both VIPs and VIUs.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF DRAWINGS

Reference is made to the attached drawings, whereby elements having the same reference numeral designations represent like elements throughout.

BEST MODE FOR CARRYING OUT THE INVENTION

The present invention is directed to the use of an ATM packet demultiplexer within a distributed network architecture of a full service network. As discussed in detail below, the disclosed ATM packet demultiplexer, also referred to as an MPEG router, provides flexibility in the addressing of video information users serviced by the network. To better understand the operation of the ATM packet demultiplexer, it is helpful first to place that demultiplexer in context. The preferred network architecture therefore is discussed first.

Figure 1:
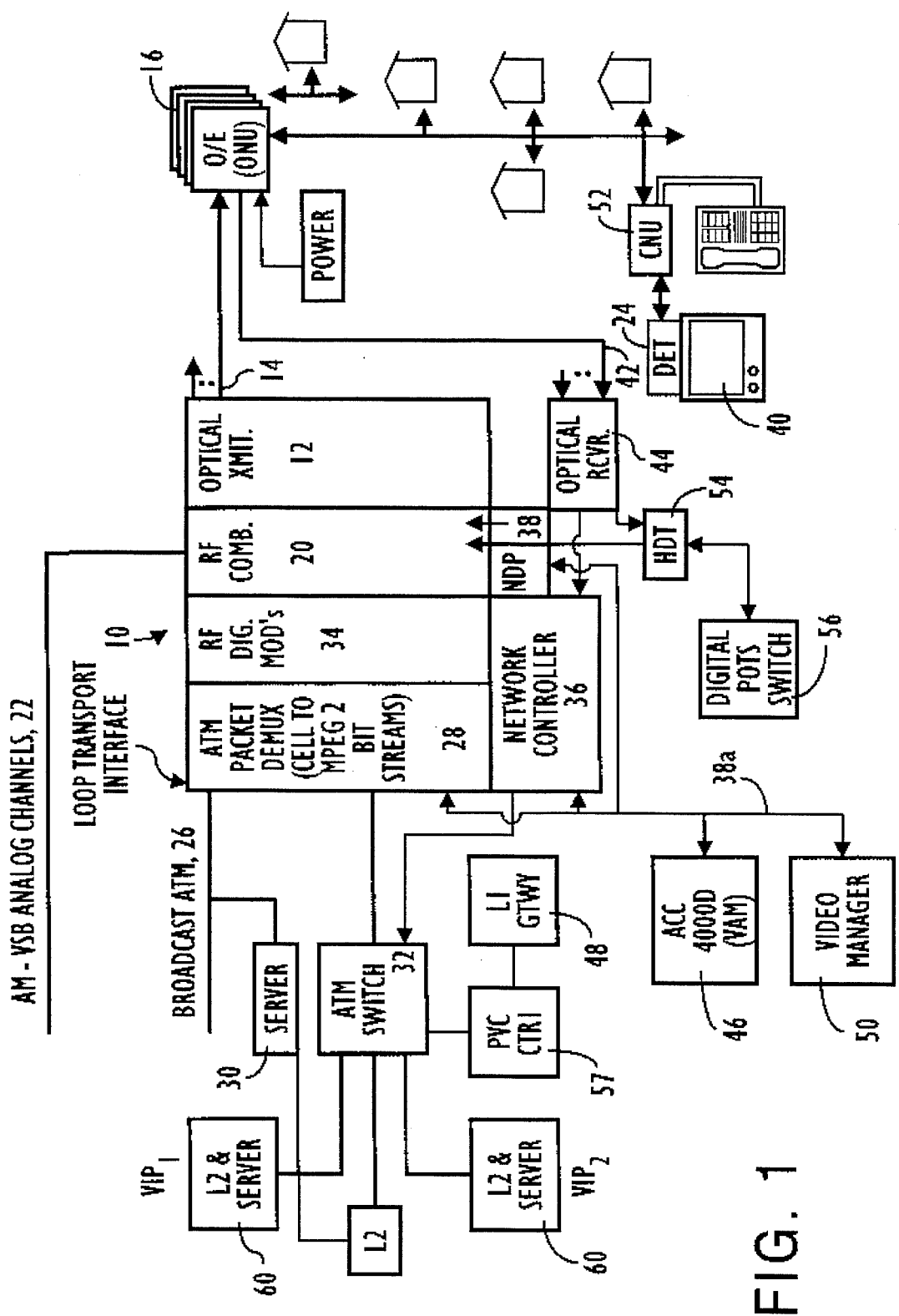
FIG. 1 is a block diagram of a proposed architecture for a video dial tone network.
Figure 2:
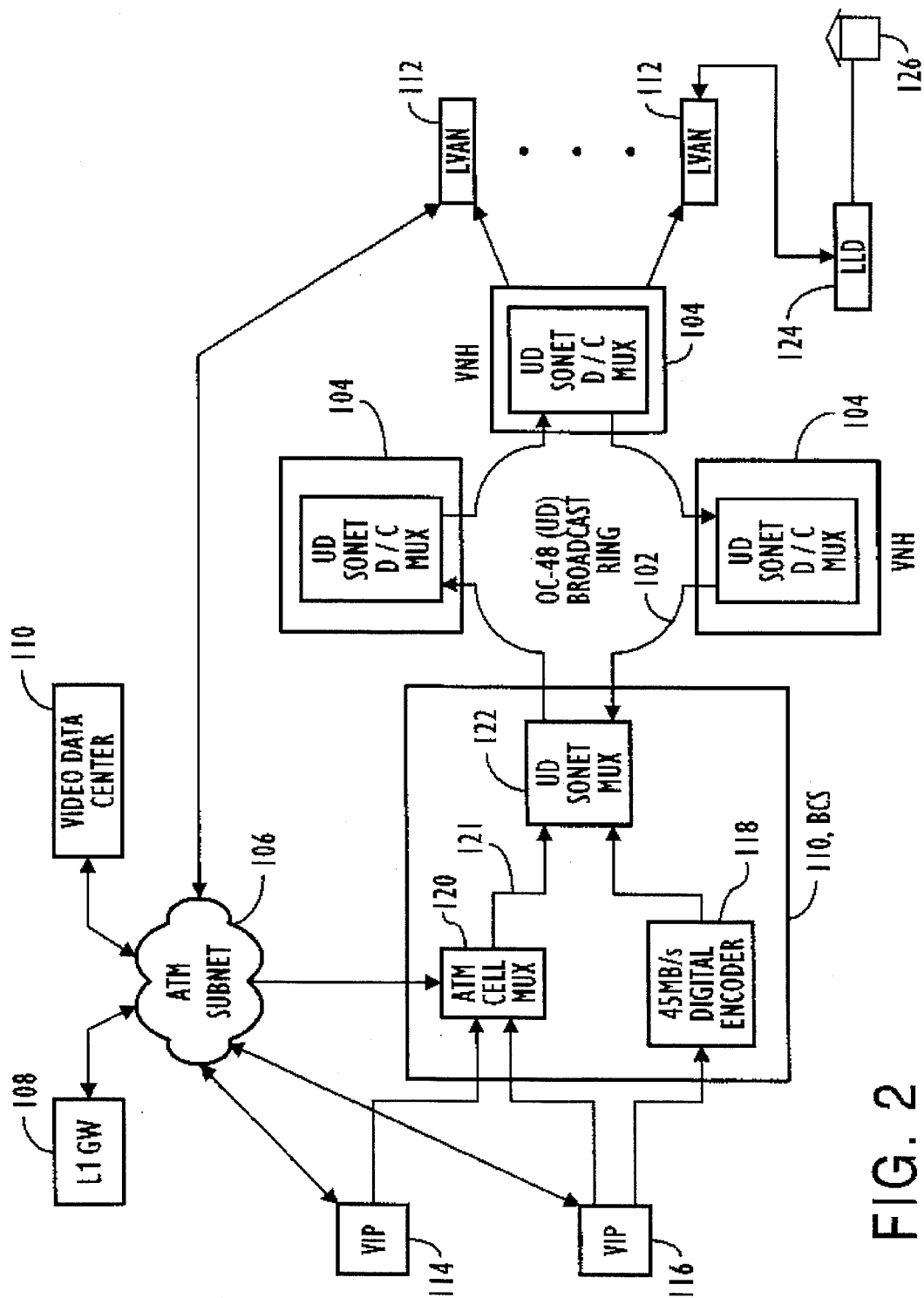
FIG. 2 is a block diagram of a distributed network architecture for a broadband data full service network according to a preferred embodiment of the present invention.

FIG. 2 discloses a distributed network architecture for a broadband data full service network according to a preferred embodiment of the present invention. The disclosed network is arranged to centralize signal processing tasks within a LATA in order to minimize hardware. At the same time, the disclosed network provides maximum flexibility by providing communications to local access nodes, each serving a local loop of subscribers.

The network disclosed in FIG. 2 includes a broadcast consolidation section (BCS) 100, a broadcast ring 102, a plurality of video network hubs (VNH) or video access nodes 104 coupled to the broadcast ring 102, an ATM backbone subnetwork 106, a level 1 gateway 108, a video data control center 110, and a plurality of video end offices or local video access nodes (LVANs) 112. According to the preferred embodiment, each of the video network hubs 104 will serve a corresponding plurality of up to six (6) LVANs 112. In addition, the preferred embodiment will provide up to sixteen (16) VNH's 104 serviced by the ring 102.

The broadcast consolidation section 100 serves as the broadcast head-end and network interface (NI) for broadcast VIPs 114 and 116. The broadcast consolidation section 100 is adapted to receive broadcast video data in any format that may be convenient for the VIP. Specifically, the broadcast consolidation section 100 includes a digital encoder 118 to convert baseband analog video signals, for example from VIP 116, into a digitally-compressed DS-3 signal stream. Alternatively, the digital encoder 118 could be replaced with an MPEG-2 encoder to provide compressed MPEG-2 packets at a DS-3 rate.

The broadcast consolidation section 100 also includes an ATM cell multiplexer 120, also referred to as an ATM edge device, which performs policing and rate conversion of incoming ATM streams. The ATM edge device 120 performs policing of ATM cell streams by monitoring the data rate of incoming data streams from VIPs. For example, if the VIP 114 has subscribed by contract to transmit a data stream at 3 Mbit/s to the network, the ATM edge device 120 will prohibit or drop ATM cells that are transmitted above the subscribed bit rate; in this case, a 6 Mbit/s stream would be rejected as an unauthorized rate.

In order to maximize the data-carrying capacity of the ATM streams supplied to the ATM edge multiplexer 120, the VIP 144 and the VIP 116 will preferably supply digital video signals in compressed MPEG-2 format that are transported in ATM cells.

The MPEG-2 standard, recognized in the art, provides a standardized format for packetizing the compressed audio and video information and for transporting other data. Under the MPEG-2 standard, incoming individual video signals and related audio signals are encoded and packetized into respective Video and Audio Packetized Elementary Streams (PES). The video and audio PES's from one or more sources of video programming may be combined into a transport stream for transmission or storage.

Each frame of compressed program information (audio, video or data) is broken down into a series of transport packets. Although video frames can vary in length, the transport packets have a fixed 188 byte size. Thus, different frames are broken down into different numbers of MPEG transport packets. For example, for a 6 Mbits/sec encoding system, a group of frames consisting of a total of 15 frames for one-half second of video breaks down into approximately 4000 transport packets.

Transport stream packets consist of a 4 byte header section, an optional adaptation field and a payload section. The header information includes, inter alia, a synchronization byte, a variety of different flags used in reconstruction of the video frames, and a thirteen bit program identification (PID) number. PID value 0 is reserved as an indication that the packet includes program association table data. PID value 1 is reserved for identification of packets containing conditional access data, such as encryption information. Other program identification numbers are utilized to identify transport packets with the program source from which they originate.

Periodically, the transport packet for each program will also include a program clock reference (PCR) value within the optional adaptation field. For example, the PCR may be present in only 10 out of every 4000 video transport packets.

MPEG-encoded packets can be output in a variety of data rates. For example, the MPEG-2 compression standard is able to encode a video program to a 6 Mbits/sec bit stream, and packetize up to four (4) 6 Mbits/sec bit streams into a single 27 Mbits/sec stream. For other lower-rate data streams carrying text or signaling information, up to eight (8) 3 Mbits/sec bit streams can be packetized into a single 27 Mbits/sec stream, and up to sixteen (16) 1.5 Mbits/sec bit streams can be packetized into a single 27 Mbits/sec stream. Alternatively, six (6) analog audio-video program signals can be processed in parallel to provide six (6) 6.312 Mbits/sec MPEG-2 packets that can be output on a single 45.736 Mbits/sec DS-3 bit stream. In addition, a synchronous optical fiber such as SONET at 155 Mbits/sec (OC-3) can carry twenty (20) 6 Mbits/sec MPEG streams.

Thus, each of the VIPs 114 and 116 are preferably able to compress up to six (6) NTSC analog audio/video program signals in parallel into an MPEG-2 format. The resulting six (6) MPEG-2 packet streams are combined into an ATM stream before transport to the ATM edge multiplexer 120. The ATM streams may be output at a 45 Mbits/sec (DS-3) rate for carrying up to six (6) MPEG-encoded programs, or on an optical fiber at 155 Mbits/sec (OC-3) for carrying up to twenty (20) MPEG-encoded programs.

Asynchronous transfer mode or "ATM" transport is an advanced, high-speed packet switching technology. In ATM, information is organized into cells having a fixed length and format. Each cell includes a header, primarily for identifying cells relating to the same virtual connection, and an information field or "payload". According to the preferred embodiment, a 53 byte ATM cell includes a cell header consisting of 5 bytes and a payload consisting of 48 bytes of payload data. The ATM cell header information includes a virtual path identifier/virtual channel identifier (VPI/VCI) to identify the particular communication each cell relates to. For example, the virtual path identifier (VPI) may be used to identify a specific VIP 114 or 116, and the virtual channel identifier (VCI) may be used to identify a specific output port of that VIP. In such a case, for example, VIP 114 could be assigned a VPI value of "65", and VIP 116 could be assigned a VPI value of "66". Thus, the VPI/VCI value of the ATM cell header could be used to identify the source of the ATM stream.

In ATM, transfer is asynchronous in the sense that the recurrence of cells that contain information from any particular sender is not necessarily periodic. Each device using the ATM network submits a cell for transfer when they have a cell to send, not when they have an assigned or available transmission time slot. However, the ATM cells may ride in the payload of a high-speed time division multiplexed media, such as a SONET optical fiber. ATM allows any arbitrary information transfer rate up to the maximum supported by the network, simply by transmitting cells more often as more bandwidth is needed.

During the ATM conversion process, the individual programs from the MPEG packets are broken into cell payloads and VPI/VCI header information is added to map the programs into ATM virtual circuits in the corresponding output cell stream. As noted above, each MPEG packet consists of 188 bytes, whereas each ATM cell includes 48 bytes of payload data. The preferred mapping scheme uses two different adaptations. The first adaptation maps one 188 byte MPEG packet into five ATM 48 byte cell payloads. The second adaptation maps two 188 byte MPEG packets into eight ATM 48 byte cells payloads.

MPEG packets of 188 bytes map efficiently into ATM cells if pairs of packets are mapped into 8 cells. However, a delay is imposed on mapping of a first cell while waiting for the second cell in the pair. To minimize jitter during decoding, the packets carrying the PCR need to be encoded and transported quickly. To avoid delaying first packets containing a PCR while processing a second packet, the ATM multiplexer 215 maps first packets containing a PCR immediately, using the five cell adaptation procedure. As noted above, the PCR is typically present in only 10 out of every 4000 packets. Also, at least some of those 10 packets likely will arrive as the second packet of a pair. Consequently, only a very small number of packets are mapped using the less efficient 5-cell adaptation.

As noted above, each cell of a particular stream will have a header which contains a virtual path identifier/virtual circuit identifier (VPI/VCI) to identify the virtual circuit that the cells pertain to. All MPEG packets for a given program, whether video, audio or data, will be mapped into ATM cells having the same VPI/VCI. Conversely, cells having a given VPI/VCI will contain data corresponding to only one identified program. Thus, each ATM cell carrying video information for a specified program from a video information provider can be identified on the basis of its corresponding VPI/VCI.

As noted above, the VIP 114 and/or VIP 116 may transmit the ATM cells on a SONET optical fiber at an OC-3 rate, or may transmit the ATM cells at a DS-3 rate. The transmission of ATM cells in an asynchronous DS-3 signal may require a common clock reference in order to ensure frame alignment. In a particular aspect of the present invention, the network interface 100 receives the DS-3 signal carrying six MPEG-2 channels in ATM cell format from the ATM VIPs in accordance with a physical layer convergence protocol (PLCP). The PLCP is a framing structure used to ensure that ATM cells are aligned with respect to a corresponding video frame, even though there may exist drifting of a start and end of a typical DS-3 frame. Specifically, the PLCP references a DS-3 header and identifies the location of each ATM cell with respect to the DS-3 header. Since the DS-3 frame contains a maximum of twelve ATM cells, the PLCP notes the location of each of the cells 1–12 with respect to the DS-3 header. Therefore, even though there may be DS-3 frame drifting, the PLCP ensures alignment, from a cell perspective, between the cell layer and the DS-3 frame so that each of the twelve ATM cells within each DS-3 frame can be located.

The ATM edge multiplexer 120 acts as a groomer for multiple VIP terminations to prevent extraneous data from using network resources. The ATM streams from the VIPs 114 and 116 may arrive in either DS-3 format or via optical fiber in OC-3 format. The ATM edge device 226 provides a grooming function, whereby ATM cells are analyzed, on a cell-by-cell basis, to determine if they should be transmitted on the network. Specifically, ATM cell headers that do not have valid data are dropped from the ATM stream. Each valid ATM cell is mapped on the basis of its corresponding VPI/VCI header either to a valid OC-3 output port of the ATM edge device 120, or possibly to a null port. In addition, the ATM edge device 120 maps the ATM idle bits containing no information that are present in the ATM stream from the VIPs to a null port, thereby rejecting the received ATM idle bits.

The ATM cell mapping, also referred to as cell translation, enables DS-3 ATM cell streams that are transmitted at less-than-full capacity to be mapped onto at least one OC-3c stream operating at full capacity. This is particularly effective when, for example, optical fibers used by the VIPs 114 or 116 to transport DS-3 ATM streams using optical fibers will not be operated at capacity, especially when VIPs using the optical fibers have varying bandwidth requirements over time. For example, a VIP providing business news may require more bandwidth for daytime news programming, whereas a VIP providing entertainment programming may require more bandwidth during evenings and weekends. The ATM edge processor 120 processes all incoming DS-3 bit streams received thereby, and maps the DS-3 bit streams into at least one condensed, or combined bit stream for transmission through the network. Specifically, the incoming DS-3 and OC-3 streams are supplied to corresponding first-in-first-out (FIFO) input buffers internal to the ATM edge device 120 to supply the ATM cells to an internal multiplexer on a cell-by-cell basis. The internal multiplexer outputs the translated cells preferably to OC-3 output buffers for synchronous transmission on optical fibers 121. Since the ATM cells are output at a rate of 155 MHz (OC-3), each of the optical fibers 121 carry up to twenty (20) MPEG programs at 6 Mbits/sec. Thus, the ATM edge processor is able to fully load the downstream optical fibers 121 thereby to fully load the capacity of the network. A more detailed description of the ATM cell multiplexer 120 is found in copending and commonly-assigned application Ser. No. 08/380,744, filed Jan. 31, 1995 (attorney docket No. 680-109), the disclosure of which is incorporated in its entirety by reference.

According to the preferred embodiment, the digital encoder 118 outputs a digitally encoded data stream in DS-3 format (45 MB/s), and the ATM edge multiplexer 120 outputs an ATM stream in OC-3c format (155.5 MB/s), to a SONET multiplexer 122. The SONET multiplexer 122 multiplexes the DS-3 and OC-3 signals from the digital encoder 118 and the ATM edge multiplexer 120 and outputs the consolidated broadcast data onto the unidirectional optical fiber broadcast ring 102 operating at an OC-48 format (2488.3 MB/s). In other words, the SONET multiplexer 122 may receive a plurality of OC-3 optical fibers 121, either from the ATM edge multiplexer 120 or a plurality of such multiplexers. In addition, the SONET multiplexer 121 may receive a plurality of DS-3 signals from a corresponding plurality of encoders such as digital encoder 118. The SONET multiplexer 122 buffers the OC-3 and DS-3 input signals and multiplexes the input signals together at a rate of 2488.3 Mbits/sec. An exemplary SONET multiplexer is the FT-2000, manufactured by AT&T.

The broadcast ring 102 is arranged as a drop-and-continue (D/C) SONET transport to service, for example, up to sixteen (16) VNH's 104. Although the broadcast ring 102 preferably has one OC-48 fiber, the broadcast ring 102 may be modified to include 2 or more OC-48 fibers for additional traffic, or for bidirectional traffic around the ring for redundancy. As discussed below in detail with respect to FIG. 3, each VNH 104 receives the broadcast ATM streams from the broadcast ring 102, converts the ATM streams to MPEG-2 streams that are transmitted on an RF carrier, and adds local broadcast information (e.g., over-the-air access, public access channel) before transport to the LVAN 112 as RF signals, preferably by optical fibers.

Each LVAN 112 receives the consolidated broadcast data from the corresponding VNH 104. The LVAN 112 combines the received RF signals from the VNH 104 with any data transmitted by the ATM backbone subnetwork 106 addressed to a subscriber served by the LVAN 112. The resulting RF signal is transmitted via a local loop distribution network 124 to a customer premises 126. As discussed below with reference to FIG. 5, the local loop distribution 124 is preferably arranged as a hybrid fiber-coax distribution system, although an ADSL system or a fiber-to-the-curb system may be substituted. In addition, the equipment at the subscriber site includes a network interface device (NID) for splitting the RF signal, a network interface module (NIM) for decoding encrypted data from the network and routing MPEG data streams, and a digital entertainment terminal (DET) for decoding the MPEG data streams passed by the NIM. Additional details regarding the NIM and the DET are discussed below with reference to FIGS. 5, 8 and 9.

As shown in FIG. 2, each LVAN 112 has access to the ATM backbone subnetwork 106 in order to send and receive network signaling information to and from the level 1 gateway 108 and/or the video data control center 110. For example, a video information user (VIU) who wishes service on the network via one of the LVAN's 112 may request the service either by calling a network business office by telephone or by requesting a level 1 gateway session from his or her customer premises 126 in order to perform online registration. As discussed in detail below, the ATM backbone subnetwork 106 provides signaling information between the LVAN 112 serving the VIU, the level 1 gateway 108 and the video data control center 110 in order to activate the VIU on the network, or to update the services available to the VIU.

The ATM backbone subnetwork 106 also is adapted to communicate with the VIPs 114 and 116 in order to perform account management between the VIPs, the level 1 gateway 108 and the video data control center 110. For example, the VIP 114 may supply a request to the level 1 gateway 108 for a desired bandwidth in order to broadcast a pay-per-view event at a predetermined time. The level 1 gateway 108 and the VIP 114 will determine the appropriate VPI/VCI header to be loaded onto the ATM stream to be supplied to the ATM edge multiplexer 120 of the broadcast consolidation section 100. The level 1 gateway 108 will inform the video data control center 110 of the scheduled event, as well as the VPI/VCI of the video data stream. The level 1 gateway 108 will also communicate with the VIPs 114 and/or 116 via the ATM backbone subnetwork 106 in order to maintain up-to-date lists of authorized VIUs to receive the selected VIP services.

Finally, as discussed in detail below with respect to FIG. 6, the VIP 116 may conduct an interactive (IMTV) session with a VIU via the ATM backbone subnetwork 106 and the LVAN 112 servicing the specific VIU. Although not shown in FIG. 2, the VIP 116 can conduct IMTV sessions with a VIU using a level 2 gateway and an IMTV server internal to the VIP 116. The Level 2 gateway communicates with the level 1 gateway 108 of the network as well as the network's business service center, to receive and process requests for IMTV sessions that include routing information. The IMTV server outputs broadband data for the VIU as an ATM cell stream to the ATM backbone subnetwork 106.

Communication between the network and the VIP 116, as well as between the network and the VIU, is performed via the level 1 gateway 108. From the VIU perspective, a user will communicate with the network via the level 1 gateway 108 in order to select the VIP 116 for an IMTV session. In a network providing access to multiple IMTV service providers, the user wishing to establish an IMTV session identifies the provider of choice to the level 1 gateway 108 by inputting control signals to the user's DET, which supplies the appropriate signals upstream from the customer premises 126 to the level 1 gateway 108 via the corresponding LVAN 112 and the ATM backbone subnetwork 106. In response, the level 1 gateway 108 controls the broadband routing functionality of the network to establish a downstream broadband communication link and a two-way communication signaling link between the provider and the user.

The level 1 gateway 108 receives notification of the status of broadband communications links as they are being set up and during ongoing communications through those links. The level 1 gateway 108 therefore can inform a subscriber when a requested session can not be set up with a selected service provider, i.e. because the provider's server ports are all busy or because the subscriber is not registered with the particular provider or due to some technical problem. The level 1 gateway 108 also recognizes when an established link develops a fault or is interrupted and can stop accumulating usage or billing data regarding that link. The level 1 gateway 108 can also notify the subscriber and/or the service provider of the failure.

The level 1 gateway 108 will also store various information relating to each subscriber's services and control service through the network accordingly. At least some of this stored data is accessible to the subscriber through a direct interaction with the level 1 gateway 108. For example, the user can identify certain service providers to the level 1 gateway 108 and define an authorization code or identification number which must be input before the network should provide a session with the user's equipment 126 and the identified providers.

Many of the functions of the level 1 gateway 108 relate principally to set up, monitoring and billing for point-to-point type interactive sessions. As noted above, however, a number of the Gateway functions also apply to broadcast services. For example, the interaction with the level 1 gateway 108 can be used to advance order upcoming broadcast pay per view events. At the time for the event to begin, the level 1 gateway 108 will transmit appropriate notice to the ordering subscriber's terminal. In response, the terminal may display the notice to the subscriber or the terminal may automatically turn on and/or tune to the appropriate communication link through the broadcast network to obtain the ordered event. The interactive features of the level 1 gateway 108 also permit subscribers to specify limitations they wish to place on their broadcast services, e.g. total number of hours of usage within some defined interval and/or time of day/week of permitted usage. The level 1 gateway 108 will then control the broadcast network and/or the subscriber's terminal in accord with the limits defined by the subscriber.

The level 1 gateway 108 comprises a series of application modules. A service data module maintains service data files relating to information service providers offering services through the broadband communication network. This module also maintains data files regarding information users subscribing to service through the broadband communication network. A service control module interacts with users through terminals coupled to the broadband communication system. In response to selection information from the users terminals, the service control module uses the data files maintained by the service data module, to generate requests for broadband communication sessions between selected providers and selecting users terminals. A session management module is responsive to the requests for broadband communication sessions, for identifying end to end communication connectivity needed for each requested broadband communication session. The session management module generates requests for the identified end to end communication connectivity and collects usage information relating to established broadband communication sessions. A connection management module in turn is responsive to the instructions from the session management module. The connection management module identifies entry and exit points through subsections of the broadband communication network for the communication connectivity needed for each requested broadband session. This module also interacts with a control element of each subsection of the network to obtain communications connectivity through each subsection, to establish the end to end communication connectivity for each requested session. The connection management module also provides confirmation of establishment of each requested broadband communication session to the session management module.

These and other features of the level 1 gateway 108 are described in further detail in connection with FIG. 6.

Figure 3:
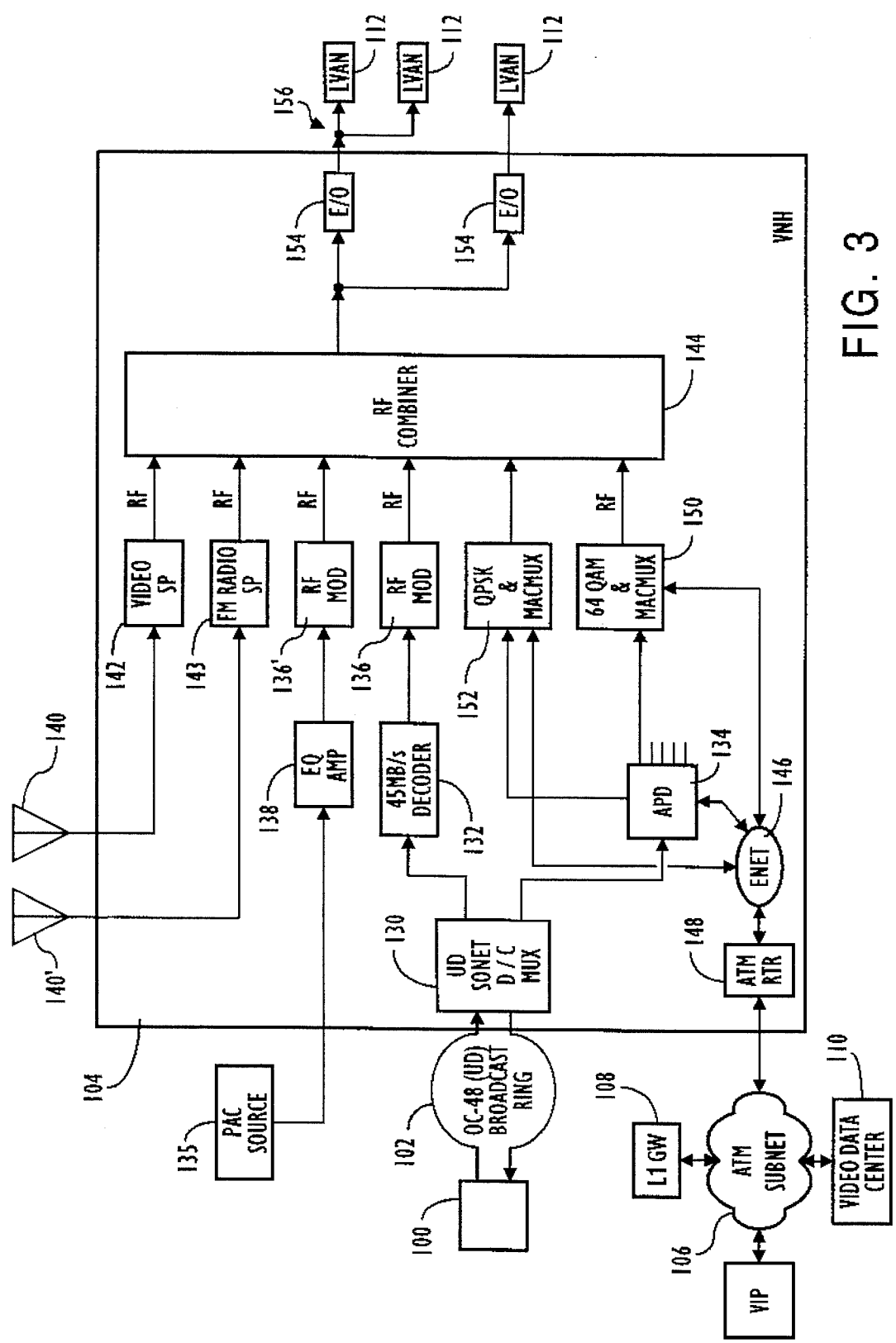
FIG. 3 is a block diagram of the video network hub shown in FIG. 2 according to the preferred embodiment of the present invention.

FIG. 3 is a block diagram of the network showing in detail a VNH 104 in accordance with the preferred embodiment of the present invention.

As shown in FIG. 3, each VNH 104, also referred to as a broadcast headend node, comprises a SONET multiplexer 130 that receives the OC-48 signal from the broadcast ring 102. The SONET multiplexer 130 is a drop-and-continue (D/C) multiplexer that "drops" the OC-48 signal from the broadcast ring 102 for local processing, and outputs the OC-48 signal to "continue" on the broadcast ring 102. The SONET multiplexer 130 converts the OC-48 signal to obtain the OC-3 ATM stream and the digitally-encoded (DS-3) baseband video signal output by the ATM edge multiplexer 120 and the digital encoder 118, respectively, as shown in FIG. 2.

The structure of ATM cells is generally recognized in the art. The ATM cell includes a header section and a payload section. In addition, the ATM cell may include additional overhead sections that provide additional vendor-proprietary features, such as priority level assignments, or forward error correction. The first byte of the header section includes a 4-bit GFC word which provides access control. The first byte of the header section also includes the lower four bits of an 8-bit virtual-path identifier (VPI). The second byte of the header section includes the upper four bits of the VPI and the first four bits of a 16-bit virtual circuit identifier (VCI). The third byte includes the next eight bits of the VCI. The fourth byte of the header section includes: the last four bits of the VCI; a 3-bit payload type (PT); and a cell loss priority (CLP) bit. The fifth byte of the header section 410 includes an 8-bit header error check (HEC) word. The CLP bit is used to manage traffic of ATM cells: in the event of network congestion, cells with CLT set to 1, indicating a lower priority, are dropped before cells with CLT set to 0.

The specific format of the ATM cell is described, for example, in the ATM User Network Interface Specification, Version 3.0, published by The ATM Forum, Mountain View, Calif., also published by Prentice Hall, the disclosure of which is incorporated in its entirety by reference. According to the ATM User Network Interface Specification, the values 0–18 for the VCI are reserved; therefore, any ATM cell having valid data must have a VCI value greater than "18". Thus, prior to transmission on the network, the ATM edge multiplexer 120 identifies ATM cells that do not have VCI values greater than "18" as idle cells that do not carry valid data.

Referring to FIG. 3, the SONET multiplexer 130 extracts the ATM cells by analyzing the input stream in 5-byte increments in order to check the header/error/check (HEC) sequence for valid ATM data; the SONET multiplexer 130 verifies the HEC sequence, extracts the 53-byte ATM cell and supplies the ATM cells to an ATM packet demultiplexer (APD) 134. As discussed in detail below, the APD 134 is adapted to receive a plurality of ATM cell streams and recover the MPEG encoded video information from the ATM cell streams. Although FIG. 3 shows only one ATM packet demultiplexer 134, in the preferred embodiment the VNH 104 includes a plurality of the demultiplexers.

The VNH 104 includes an analog portion that receives analog baseband video signals from the VIPs, from a Public Access Channel (PAC) broadcast source 135, and from Over-the-Air (OTA). Specifically, the SONET multiplexer 130 outputs the DS-3 encoded baseband video signal to a DS-3 analog decoder 132, which converts the DS-3 signal back to the VIP analog baseband video signal. The VIP analog baseband video signal is output from the analog decoder 132 to a modulator 136, which includes a tuner to mix the VIP baseband video signal from the analog decoder 132 onto a specific 6 MHz bandwidth RF channel. The PAC Broadcast Source 135 provides public access channel (PAC) programming related to community activities as a PAC baseband analog video signal, preferably via an optical fiber.

A fiber optic receiver 138 converts the optical signal from the PAC Broadcast Source 135 to a baseband analog PAC video signal that is supplied to a modulator 136' for mixing to a specified 6 MHz channel.

The analog portion of the VNH 104 also includes a plurality of antennas 140 that receive Over-the-Air (OTA) broadcast signals at VHF and UHF frequencies. The OTA signals are supplied to an analog signal processor 142, which performs signal conditioning and modulates the OTA signals to specified 6 MHz bandwidth RF channels. For example, the analog signal processor 142 may modulate the OTA television channels 4, 7 and 9 to 24, 27, and 29, respectively, in order to avoid interference with the PAC or VIP analog video channels. The VNH 104 may also include another antenna 140' that receives FM radio signals and supplies the FM signals to an FM radio signal processor 143. The signal processor 143 outputs the FM radio signal within a specified RF band, preferably the FM radio band, to the RF combiner 144.

Thus, the video signals output by the modulator 136 and the analog signal processor 142 are analog RF video signals at different 6 MHz RF channel frequencies, as well as the FM signals output by the signal processor 143. The analog signals output from the FM radio signal processor 143, the modulator 136 and the analog signal processor 142 go to an RF combiner 144. The RF combiner 144 is a passive combiner which combines the VIP, PAC and OTA analog video signals into a single video signal having a plurality of 6 MHz channels. Thus, the VIP analog video signals, the PAC analog video signals and the OTA analog video signals can be received and viewed using a conventional television set, without the need for a digital entertainment terminal. Thus, these analog video signals could make up a basic video service analogous to the type offered by contemporary cable-TV companies. The RF combiner 144, however, enables passive combining of different baseband analog video signals, as opposed to known cable-TV systems, which require a rewire of modulators whenever a change was made in channel allocation. Thus, changes in the channel allocation in the disclosed embodiment can be made merely by reprogramming the modulator 136 and the analog signal processor 142. As discussed below, the RF combiner 144 is also adapted to combine RF signals carrying the compressed digital video signals from the VIP.

The digital portion of the VNH 104 receives the compressed VIP digital video signals from the recovered OC-3 ATM stream output from the SONET multiplexer 130. The OC-3 ATM stream is output from the SONET multiplexer 130 to one of several ATM packet demultiplexers (APD) 134 (only one shown for convenience). The APD 134 performs ATM processing by recovering the original MPEG-2 packets on the basis of the VPI/VCI headers of the incoming ATM streams. The MPEG packets can be output from the APD 134 without further processing if the VIPs follow a predetermined provisioning, whereby the PID values for predetermined data streams remain constant. Alternatively, the APD 134 performs MPEG routing, whereby the reconstructed MPEG packets are assigned a new PID value based on the VPI/VCI value of the ATM stream that carried the MPEG packets. This mapping of a new PID value in response to the VPI/VCI of the ATM stream is based upon a translation table loaded into the ATM packet demultiplexer 134 via a signaling path 146 (Ethernet or the like), discussed in detail below. The translation table, also referred to as MPEG routing information, is supplied from a video manager in the video data center 110 (discussed in detail with respect to FIG. 6).

The MPEG routing also includes outputting the MPEG packets in accordance with the loaded translation table and the VPI/VCI of the corresponding ATM cell stream. Specifically, the reconstructed MPEG packets are routed from the ATM packet demultiplexer 134 onto one of five 27 MB/s digital signal paths that serve as inputs to a corresponding modulator/multiplexer 150. The modulator/multiplexer 150 is a Quadrature Amplitude Modulator (QAM) operating at 64 QAM, whereby media access control (MAC) is performed to ensure proper timing of the resulting time-division multiple access (TDMA) signal. Thus, each of the five 27 MB/s digital signals are 64 QAM modulated and multiplexed into an IF signal, which is upconverted into a specific 6 MHz channel. The QAM/Multiplexer/Upconverter 150 outputs the 6 MHZ channels to the RF combiner 144 for combining with the other 6 MHz RF signals. The RF combiner 144 thereafter outputs the combined RF signals to multiple lightwave transmitters 154, which output the combined RF signals on an optical fiber 156 for transmission to the local video access nodes 112.

Although the disclosed network is designed to transport digital broadband data for high data-rate applications such as video, the APD 134 of the present invention enables the network to transport low data-rate information to be broadcast from an information provider to the VIUs. For example, an information provider may wish to periodically broadcast application software or signaling information on a low-rate channel. In such a case, the ATM packet demultiplexer 134 will determine from the VPI/VCI that the data recovered from the ATM cell stream is a low-rate data signal; consequently, the ATM packet demultiplexer 134 will output the low-rate data signal in MPEG format to a QPSK modulator 152, which modulates the low-rate data signal for RF transmission after passing through the RF combiner 144. The low data rate transmission may carry text or signaling information from a VIP in some way relating to one or more services offered by that VIP. A more detailed description of the operations of the ATM packet demultiplexer is disclosed with respect to FIG. 7 below.

The signaling path 146 coupled to the components of the VNH 104 is preferably an Ethernet communication path, for example a 10-Base T LAN. Although not shown, the Ethernet signaling path 146 provides signaling and control signals to each of the components of the VNH 104. The Ethernet signaling path 146 communicates with the video data control center 110 via the ATM backbone subnetwork 106 in order to provide the operating status of each of the components of the VNH 104. Specifically, the Ethernet signaling path 146 provides upstream signaling data to an ATM router 148, which packets the Ethernet signals in ATM format, provides a VPI/VCI header corresponding to the internet protocol (IP) address of the intended destination of the Ethernet signal, and outputs the ATM stream onto the ATM backbone subnetwork 106. The ATM backbone subnetwork 106 routes the ATM stream from the ATM router 148 of the VNH 104 to a corresponding ATM multiplexer at the video data control center 110. Preferably, the ATM backbone subnetwork 106 routes ATM streams between the VNH 104 and the video data control center 110 along dedicated virtual paths. The ATM multiplexer at the video data control center 110 receives the ATM stream, reassembles the Ethernet signals, and outputs the Ethernet signals on its local Ethernet bus with an IP address destination corresponding to the VPI/VCI of the ATM stream. The ATM virtual circuit to the video data control center 110 is a two-way circuit and carries instructions from the video data control center 110 back to the components of the VNH 104.

Figure 4:
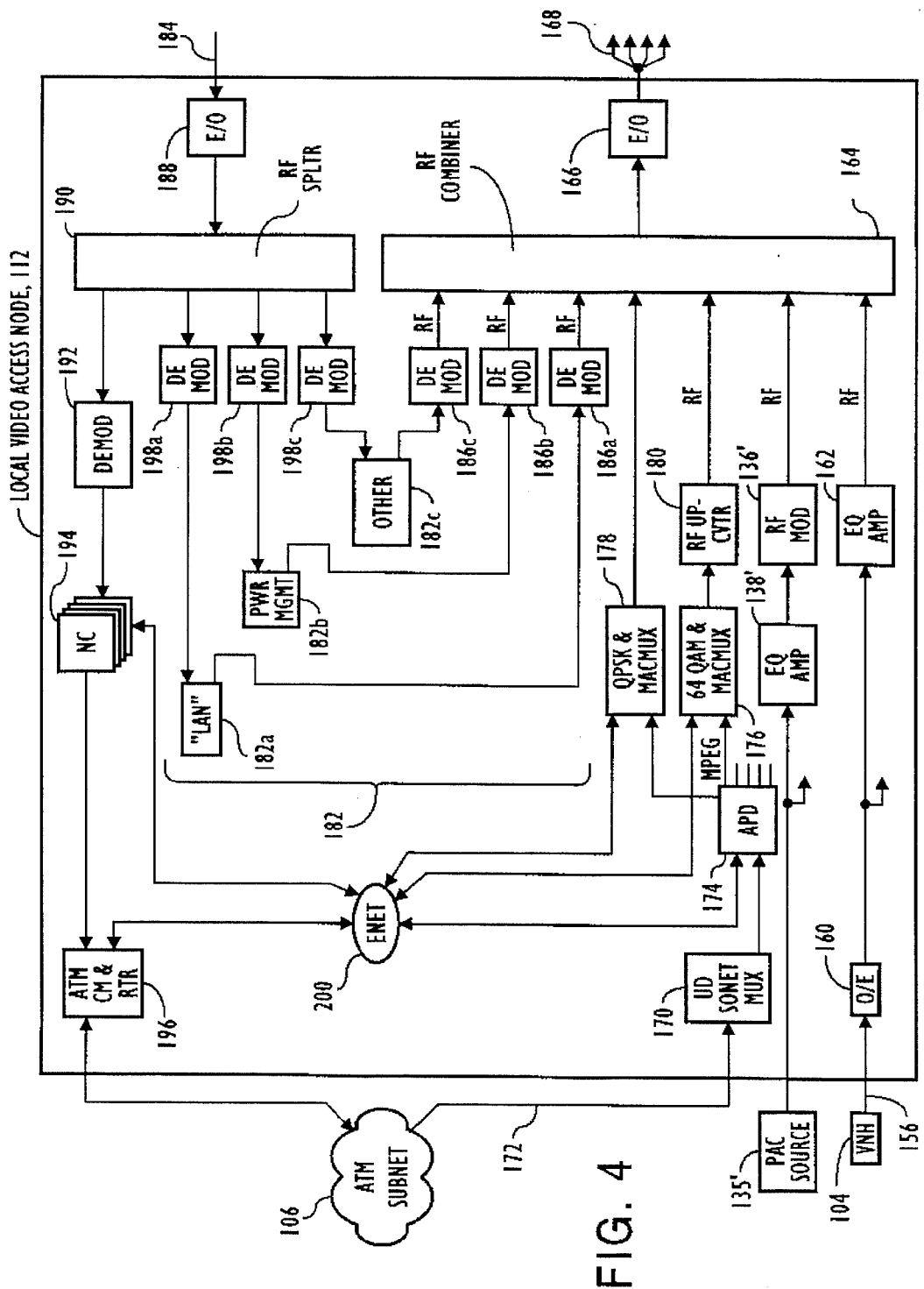
FIG. 4 is a block diagram of the video end offices shown in FIG. 2 according to the preferred embodiment of the present invention.

FIG. 4 discloses one of the network local video access nodes (LVAN) 112 according to a preferred embodiment of the present invention. The disclosed LVAN 112 is one of a plurality of LVANs that is distributed throughout the network service area in order to provide service to customers. In early implementation stages, however, it is anticipated that the first deployed LVAN 112 may be collocated with the VNH 104 in order to service a limited service area. Later deployed LVANs 112 will be located remotely from the VNH 104.

As shown in FIG. 4, the LVAN 112, also referred to as a video central office or video end office, includes an optical-to-electrical (O/E) receiver 160 that converts the optical RF signal from the optical fiber 156 to an electrical RF signal. The RF signal output from the 0/E receiver 160 is supplied to an equalization amplifier 162 for signal conditioning before RF combination by a series of multiple RF combiners 164, similar to the RF combiners 144 shown in FIG. 3. The combined RF signal is output from the RF combiners 164 and reconverted to optical signals by the electrical-to-optical (E/O) transmitters 166. The E/O transmitter 166 supplies the optical signal to the local loop distribution via optical fibers 168.

If desired, the LVAN 112 may also combine the RF signal from the VNH 104 with a local PAC broadcast signal supplied by a local PAC source 135. In such a case, the local PAC broadcast signal is received by a fiber optic receiver 138, which supplies the conditioned local PAC broadcast signal to the modulator 136 for conversion to an RF signal at an available 6 MHz channel before combining by the RF combiner 164.

According to the present invention, the LVAN 112 includes an ATM packet demultiplexer that enables MPEG routing of data received via the ATM subnetwork 172, including interactive video data, signaling data, or software data. The structure of the APD 174 is identical to that of the APD 134 in FIG. 3. As described in detail below, the ATM packet demultiplexer performs MPEG processing on data recovered from the ATM cell streams and outputs the recovered data as data packet streams MPEG-2 format. Thus, the ATM packet demultiplexer provides an "any-data" transport feature, whereby the LVAN 112 is able to transport any-format data received from the ATM subnetwork 172.

Thus, the LVAN 112 provides any-data traffic between the VIU and the network, such as signaling traffic and broadband traffic for interactive multimedia television (IMTV) sessions. Specifically, the LVAN 112 includes a SONET multiplexer 170 that receives optical signals carrying ATM streams from the ATM backbone subnetwork 106 via a unidirectional OC-48c optical fiber 172. The SONET multiplexer 170 converts the OC-48 signal into OC-3 signals carrying ATM streams. The ATM cells transport IMTV traffic and VIU signaling traffic from the VIPs and the network, respectively. Each OC-3 signal is input to an APD 174, which repackets the ATM cells into recovered data, and performs MPEG processing and assigns a PID value based on the VPI/VCI value of the received ATM cells and routing information from the video manager of the video data center. The video manager supplies the routing information including the translation table to the APD 174 via the ATM subnetwork 106 and the Ethernet data network 200. If the recovered data is broadband data that is already in MPEG-2 format, the APD 174 merely verifies the appropriate PID value for the MPEG packet stream. The APD 174 preferably is identical to the ATM packet demultiplexer 134 in the VNH 104, although the latter primarily performs MPEG routing for broadcast video data.

The APD 174 determines from the VPI/VCI value and the loaded translation tables whether the ATM cells transport broadband data such as video, or narrowband data such as VIU signaling information or text data. In accordance with the translation tables, the APD 174 outputs the broadband data as MPEG streams on one of five 27 MB/s signal paths to one of five 64-QAM MACMUX modulators 176. In addition, the APD 174 outputs the narrowband data as an MPEG stream onto a RS-530 (1.5 MB/s) signal path to a QPSK modulator 178, which modulates the MPEG stream carrying narrowband data for combining by the RF combiner 164. The 64-QAM MACMUX modulator 176 outputs the modulated broadband signal to an RF upconverter 180, which outputs the modulated broadband signal on an available 6 MHz RF channel for splitting and combining by the RF combiners 164. Thus, the RF combiner outputs a combined RF stream carrying 6 MHz channels of information to the VIUs from different sources, including broadcast VIPs, PAC Broadcast Source 135', IMTV VIPs, and network controllers for signaling traffic.

The information output by the RF combiner 164 is not limited to broadband video from broadcast or IMTV VIPs, and signaling traffic from the network. Rather, since the VIU is able to transmit information to the LVAN 112 via a optical fiber upstream signaling link 184, the LVAN 112 may be adapted to transmit to the VIUs information from any data source. For example, reference numeral 182 denotes other data sources that can use the disclosed network for transport to the VIU: a user could remotely access a LAN source 182*a* using the upstream signaling link 184 for two-way communication; the network could control power to the user's DET, or alternatively work in conjunction with electric utilities to read a user's electric meter using a power management controller 182*b*; or a reserved port 182*c* could be set aside for future interactive data applications. In such a case, the data is output from one of the sources 182 to a corresponding RF modulator 186 before combining by the RF combiner 164.

Upstream signaling from the VIU is received from the upstream signaling link 184 by an E/O receiver 188, which outputs the multiplexed RF signal from the VIUs to an RF splitter 190. The RF splitter 190 splits the RF spectrum and outputs the split RF spectrum on predetermined signal paths. For example, a predetermined RF channel will contain signaling information to be supplied from the VIU to the Level 1 gateway 108, such as a request for new service, or a request for an IMTV session with a VIP via a Level 2 gateway. This VIU signaling information will be supplied to a demodulator 192 to demodulate the signaling information off the RF carrier. The demodulator 192 will output the demodulated VIU request to one of thirteen (13) network controllers (NC) 194, each of which processes the VIU request and identifies the destination for the request. The NC 194 passes the VIU request to an ATM router 196, which receives inputs from the network controllers, packets the VIU request in an ATM cell stream, adds a VPI/VCI header to identify the destination of the request, and outputs the ATM stream onto the ATM backbone subnetwork 106. The processing of the VIU request is discussed in more detail below with respect to FIG. 6.

As discussed above, the upstream signaling link 184 may provide upstream signaling data for the other data sources 182. For example, the RF splitter 190 outputs an RF signal at a predetermined band to one of the demodulators 198 corresponding to the devices 182. The demodulators 198 remove the RF carrier signal and output the demodulated signal to the corresponding device 182.

As discussed above with respect to FIG. 3, the VNH 104 includes an Ethernet control network to control the components of the VNH 104. Similarly, the LVAN 112 comprises an Ethernet system 200 for controlling the components of the LVAN 112. As discussed in detail below with respect to FIG. 6, the Ethernet system 200 communicates with the network via the ATM router 196, which passes Ethernet messages between the Ethernet system 200 and remote Ethernet systems via the ATM backbone subnetwork 106.

Figure 5:
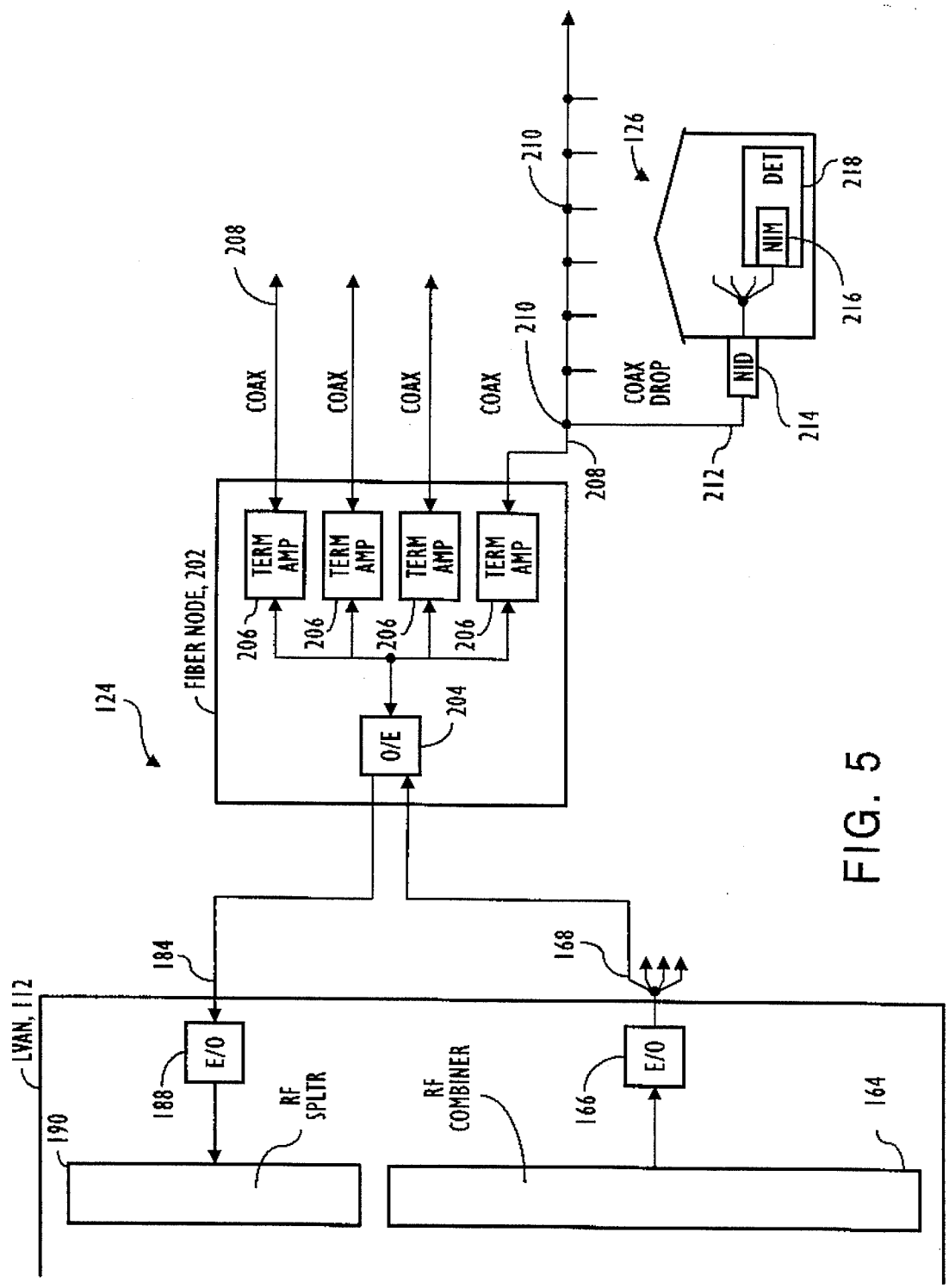
FIG. 5 is a block diagram of the access subnetwork shown in FIG. 2 according to the preferred embodiment of the present invention.

FIG. 5 discloses an exemplary implementation of the local loop distribution network 124 shown in FIG. 2 in accordance with the preferred embodiment of the present invention. Although the local loop distribution 124 shown in FIG. 5 is a hybrid-fiber coax system, one having ordinary skill in the art will appreciate that other local loop distribution systems may be used, such as Asymmetrical Digital Subscriber Loop (ADSL), Fiber-to-the-Curb, or direct fiber to the living unit.

As shown in FIG. 5, the combined RF signal output from the RF combiner 164 is converted to an optical signal by the E/O transmitter 166 and output to the local loop distribution 124 on the optical fibers 168. Generally, the optical signal will be provided to a plurality of optical fibers via an optical splitter, preferably a maximum of four optical fibers per combiner 164. Each optical fiber 168 carries the combined analog RF signal to a fiber node 202. According to the preferred embodiment, each fiber node 202 is designed to serve one broadcast service area (BSA) of up to 500 homes passed. The fiber node 202 comprises an O/E transceiver 204 that converts optical and electrical RF signals to and from a plurality of terminal amplifiers 206, respectively. Each terminal amplifier 206 outputs the electrical RF signal onto a coaxial cable 208. The coaxial cable 208 is designed to pass one hundred twenty five (125) homes. Specifically, a tap 210 is installed along the 208 for each living unit that wishes activation on the network. A coaxial drop cable 212 is wired between the 210 and the customer premises 126. Thus, assuming each home receives a tap 210 for service on the network, each coax cable 208 will service up to 125 homes.

As shown in FIG. 5, the customer premises 126 includes a network interface device (NID) 214, a network interface module (NIM) 216, and a digital entertainment terminal (DET) 218. The NID 214 receives the coax drop 212 and splits the RF signal into four coax signal paths. Each home or living unit 126 is preferably allocated a capacity of four digital entertainment terminals 218 (DET's). Each coax feed is supplied to the NIM 216, which demodulates the RF signal at a user-specified channel frequency. If the demodulated RF signal is an analog video signal from an analog source (such as the PAC 135), the NIM 216 passes the baseband analog video signal directly to the television set (not shown) without further processing by the DET 218.

If, however, the NIM 214 receives an MPEG encoded signal, if the MPEG encoded signal has a PID value corresponding to the NIM's assigned PID value, for example the NIM's E.164 address, the NIM 214 processes the MPEG stream as NIM signaling data If, however, the PID value corresponds to the DET address, the NIM 214 performs MPEG processing on the MPEG stream as DET signaling data and outputs the recovered DET signaling data to the DET CPU. Otherwise, the MPEG stream is passed to the DET as information-carrying (e.g., video) MPEG streams after the NIM 214 has de-encrypted the 27 Mb/s MPEG encoded signal using a key downloaded from the network's ACC-4000D (described in detail below). The MPEG processor within the main portion of the DET 218 identifies an MPEG stream to be transmitted to the DET 218 by the PID value. Thus, the DET 218 decodes only an MPEG stream having a specified MPEG PID value in accordance with the user's request for service. Further, network security is improved by limiting the information that passes from the NIM 214 to the DET 218; thus, the DET 218 will not receive any unauthorized encryption keys or unauthorized network signaling information. Additional description regarding the operation of the NIM 214 and the DET 218 is found below with respect to FIGS. 8 and 9.

The DET of the present invention is an open interface device in that it interacts with equipment of a large number of service providers (often referred to as "VIPs") to offer users a wide array of video and interactive multi-media services. The digital entertainment terminal (DET) is a programmable device to which different individual video information providers (VIP's) can download applications software, and at least one VIP (the VIP selling the DET) can download all or a part of the operating system. In non-volatile memory (ROM and non-volatile RAM), the DET will store a loader program and an operating system. The loader program and operating system in the ROM and the non-volatile RAM will include sufficient programming to control initial communications and define interfaces and drivers, e.g. for graphics to define the base line functionality of the DET for all service applications the DET will run.

The DET 218 receives selected MPEG streams from the NIM 214, and decompresses selected MPEG packets in order to recover the original digital signal. If the digital signal is narrowband signaling information for the DET 218, the signaling information is supplied to the DET microprocessor for appropriate processing. If the digital signal is broadband information, the DET determines whether the signal is digital video data or other broadband data, and supplies the data to the television or the DET microprocessor, accordingly.

With the present invention the DET 218 is adapted to receive and store downloaded control software. The DET 218 can establish a link to the network via a level 1 gateway session to receive operation systems code, default channel maps, and permissions tables in order to receive broadcast services from multiple VIPs. In some cases, the DET may also establish a point to point link to a VIP's interactive equipment. For broadcast services, the DET captures a cyclically broadcast application, for example navigation software.

According to the present invention, the DET 218 identifies control software from video data received on the selected in-band broadband channel on the basis of PID values. The DET 218 receives connection block descriptors (CBD's) during a level 1 gateway session that identify the packet location in the transport stream of a program map for each source of programming in the transport stream. The program map, in turn, specifies the PID values for packets continuing video, audio and/or data from the particular source. For example, the CBD's may specify that the program map for CBS is found at RF channel 13 in packets corresponding to PID 132; the program map for NBC might be found at RF channel 13 in packets identified by PID 87 and so forth. The program map for CBS in the packet with PID 132 would then identify the PID numbers for the actual packetized elementary streams (PES) for the video and audio channels associated with the CBS program.

One should note at this time that typically there are more than two PID's associated with programming from one source. For example, there could be a data channel associated with the program which would include data for closed captioning for the hearing impaired and/or in-band control signaling data. There could be a number of audio elementary streams, for example, carrying respective different languages in addition to normal stereo audio channels. Thus the programming map provides some flexibility beyond that required for merely associating a single video and audio elementary stream.

Once the DET 218 identifies and captures the programming map, the program decoder can extract the video elementary stream, the audio elementary stream(s) and any associated data stream(s) for decoding of the programming.

Within an identified video elementary stream, video sequence headers define things like frame rate, resolution, and the coordinates on the screen where display of the image should begin. Such coordinates are useful, for example, in defining pictures within a picture when multiple pictures are superimposed. In each video stream packet, after the video header sequence, the packet contains the actual video syntax which, in the case of MPEG, includes the normal frames associated with video compression, such as I frames and B frames, etc., in MPEG.

The NIM 216 according to the preferred embodiment stores the encryption keys that are supplied from the APD 174 via the downstream signaling channel output on the 64-QAM MACMUX modulator 176 and the RF upconverter 180 in FIG. 4. Thus, a user's DET 218 receives only authorized MPEG data streams, thereby improving network security and reducing the ability of unauthorized users from accessing other video programming.

According to the preferred embodiment, an authorized user can request an IMTV session with a VIP so that the corresponding level 2 gateway and associated server can download application program software to the application memory in the DET. The DET can receive and load software applications either through one or more broadcast channels or through a signaling channel. The downloaded applications software controls a wide variety of DET functions in accord with each VIP's services. For example, this software may specify the functionality of the user interface (UI), navigation through broadcast channels, types of transactions to be performed, graphics styles, etc. At least some of the software/data downloaded through a broadcast channel preferably controls "channel mapping" functions of the DET, to permit an end user to easily navigate through the channels carrying the services of each broadcast VIP. Once all necessary software resides in memory in the DET, the user begins interaction with the services offered by the particular service provider or VIP.

The downloaded software from one service provider or VIP might present menus and prompts in simple text form. Another provider, however, might choose to present menus and prompts in a much more graphical form approaching virtual reality. Graphics and a small number of frames of video can be downloaded and stored with the application software.

In accordance with the preferred embodiment of the present invention, the disclosed broadband network utilizes certain broadcast channels as VIP control channels to continuously transmit software control signals. For example, the DET is downloaded with a default channel map from the Level 1 gateway 108. Part of that map may identify by broadcast channel and PID value control channel information for basic services. In order to obtain premium access from a particular VIP, the user would request a level 1 gateway session in order to receive the connection block descriptors (including RF channels and PID values) and any encryption keys for the control channel of a selected VIP. Once the DET stores the connection block descriptors and the NIM stores the encryption keys, the user is able to decode the VIP software control signals. The software control signals allow any user to randomly identify and select available VIP services, and may include navigation software which includes instructions for controlling selection of video services and a program or channel map for identifying the RF channel and the PID values for video, audio, or data packets for each program service. The program map information at least facilitates rapid channel changes (channel surfing) through the VIP's broadcast services, using channel identifiers arbitrarily selected by the VIP, for convenience and/or ease due to user acceptance.

Such navigation software, when loaded by the DET, may also be implemented as a menu program operating as an electronic TV Guide that is recalled each time the user presses a predetermined button, for example "GUIDE", on the remote control. In this example, the first time a user presses the "GUIDE" button on a remote control after turning on the DET, the DET jumps to the control channel broadcasting the navigation software for the network or for a predetermined VIP. From that channel, the DET captures and executes the navigation program in real-time. Thus, real-time execution minimizes the amount of memory necessary for the DET; in addition, there is no need to establish a level 1 or level 2 gateway session to download software, thereby minimizing network traffic. Alternately, the DET may initially download a portion of the software (e.g. the executable code) during turn-on, and access menu data from the control channel when the user presses "GUIDE"; this variation will result in an increase in the execution speed of the navigation software. In another variation, the DET may download software and data during turn-on, and subsequently download only update data.

During use by a user, the DET at turn-on enters a mode for reception of the broadcast service. In such a case, the non-volatile memory in the DET stores operating system software including instructions for controlling selection of the broadcast services and a primary channel map for identifying control channels of VIPs that are available on the network. The non-volatile memory may be loaded at the factory, or by a level 1 gateway session with the network during registration of the DET. If interactivity with a particular VIP is desired, the level 1 gateway would be accessed in response to a user operating an appropriate button on the remote control, after which the user would select a VIP, and the DET would interact with the VIP's level 2 gateway and file server to obtain applications software programming and/or operating system changes, as discussed in more detail in commonly-assigned pending application Ser. No. 08/250, 791, filed May 27, 1994, the disclosure of which is hereby incorporated in its entirety by reference.

Alternatively, the DET could turn-on with a loader program that executes a mode for scanning the broadcast channels for tag data for corresponding VIP's. Once scanning is complete, the DET will have compiled a primary channel map including the information necessary to access one of the available VIP services. The stored program/ channel mapping tables permit users to select channels with a standard channel number even though the program may be carried on an unrelated channel within the network. For example, one broadcast provider might carry the local NBC station on channel 17, another broadcast provider might carry that station on channel 77, and the local over the air broadcast would be on standard RF TV channel 4. If the user selected the first provider, the mapping table would indicate that broadcast channel 4 is carried on network channel 17. If the user selected the second provider, the mapping table would indicate that broadcast channel 4 is carried on network channel 77. In either case, the user would select the channel simply by inputting the number 4. The subscriber does not need to know which network channel each VIP uses for that broadcast service.

Although prior systems allowed the same DET to be used in a variety of different networks only with a substitution of a different network interface module to adapt the DET to each particular network, a user's DET can be fully compatible with any network that broadcasts VIP tag data in accordance with the present invention, regardless of the content of a particular broadcast channel. A more detailed description of the structure of the DET and the operations thereof involved in downloading applications software and operating system changes into the DET are disclosed in pending application Ser. No. 08/380,755, filed Jan. 31, 1995 incorporated herein in its entirety by reference.

Figure 6:
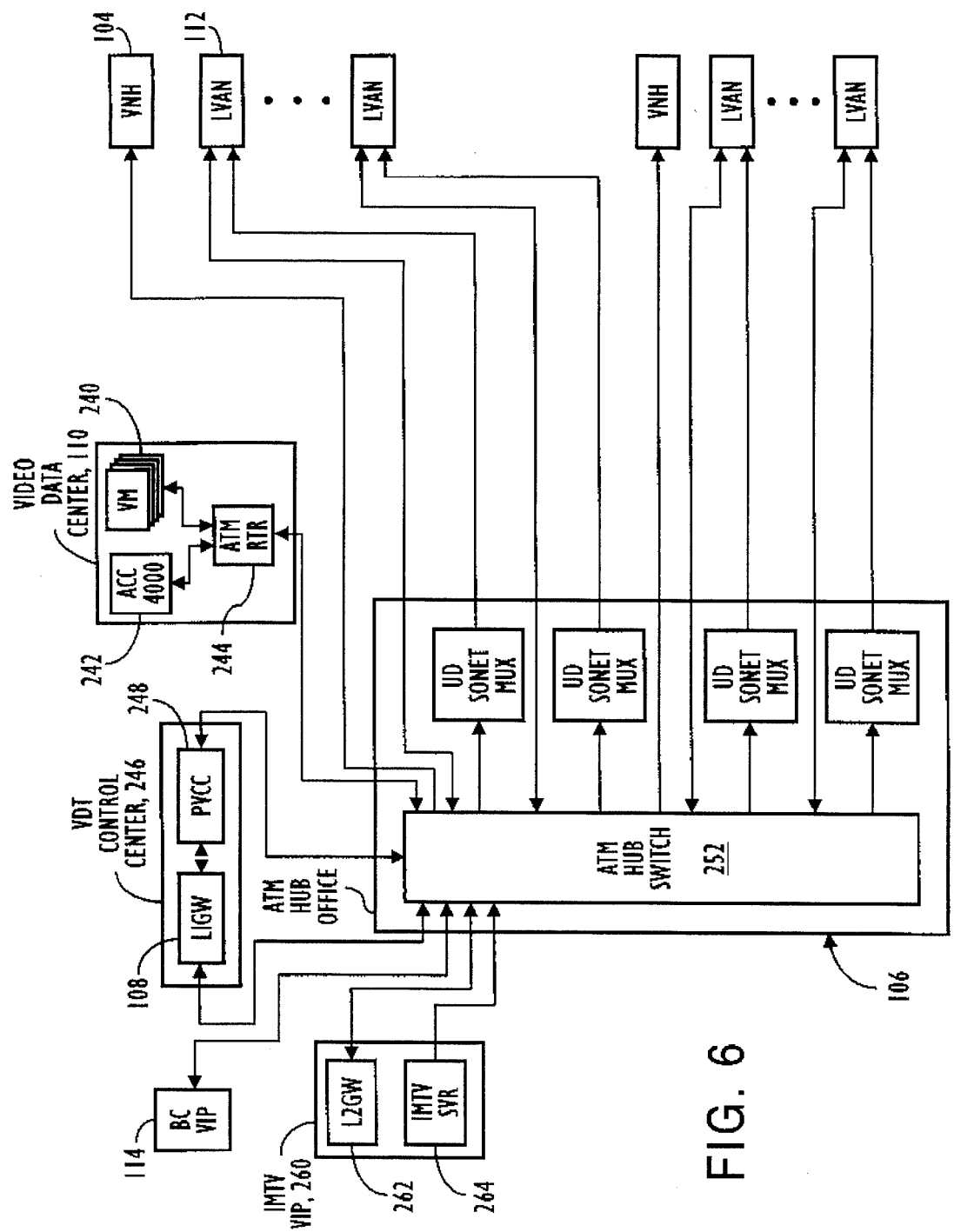
FIG. 6 is a block diagram of the ATM backbone network and the control systems for the full service network shown in FIG. 2.

FIG. 6 is a block diagram illustrating the relation of the ATM backbone subnetwork 106, the video data control center 110, and a Video Dial Tone (VDT) control center including the level 1 gateway 108 shown in FIG. 2. As shown in FIG. 6, the video data control center 110 includes a video manager (VM) 240, an ACC-4000 242, and an ATM router 244 for sending and receiving ATM cell streams to and from the ATM backbone subnetwork 106. The VDT Control Center 246 comprises the level 1 gateway 108 and a Permanent Virtual Circuit (PVC) controller 248.

The ATM backbone subnetwork 106 comprises at least one ATM hub office comprising an ATM switch 252, and a plurality of unidirectional SONET multiplexers 254. Although only four (4) SONET multiplexers 254 are shown in FIG. 6, it should be understood that all connections to and from the ATM switch 252 are preferably at a transmission payload rate of OC-3 . In future embodiments serving larger numbers of VIU's and interactive service VIP's, the ATM backbone subnetwork 106 will include local access ATM switching offices connected to the hub ATM switch 252.

According to the preferred embodiment, the ATM switch 252 routes all ATM streams on the basis of the VPI/VCI of the cell streams. The ATM stream virtual path is controlled by the PVC controller 248, which provides switching control to the ATM switch 252 to set up the virtual paths in the ATM switch 252 from the source to the destination in response to assignments from the level 1 gateway 108. In addition, each VNH 104 and LVAN 112 is assigned a predetermined virtual path for communication with the video data control center 110, thereby relieving management requirements by the PVC controller 248. Thus, upstream signaling traffic from a VIU to the level 1 gateway 108 or the video data control center 110 is routed along dedicated virtual paths.

Figure 7:
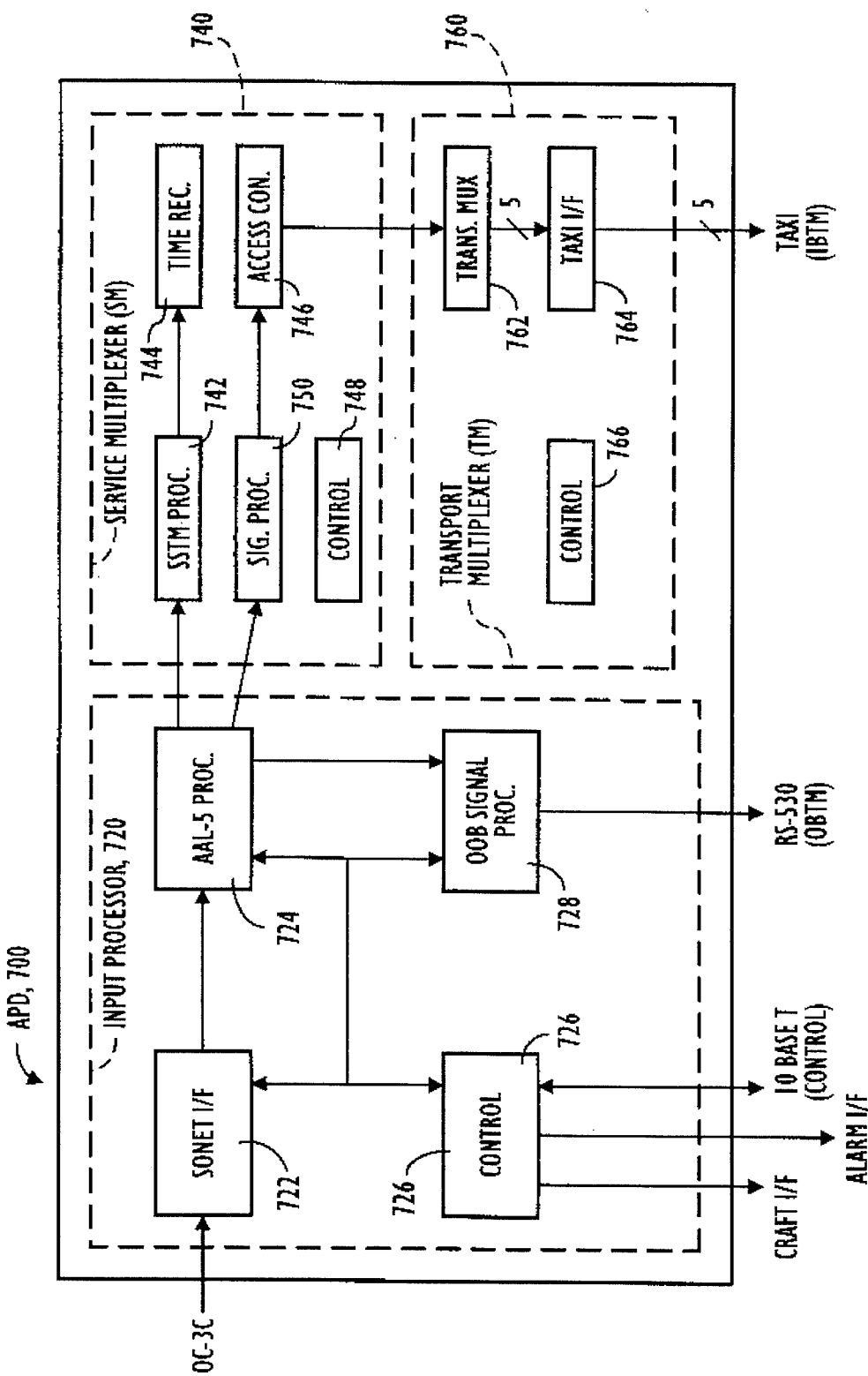
FIG. 7 is a block diagram of the ATM packet demultiplexer shown in FIG. 4 according to the preferred embodiment of the present invention.

FIG. 7 discloses a preferred embodiment of the ATM packet demultiplexers 134 and 174 used in the VNH 104 and LVAN 112, respectively. The APD 700 is adapted for use in either the VNH 104 or the LVAN 112, whereby the VNH 104 will preferably have at least ten (10) APD's 700 for processing broadcast data, and the LVAN 112 will preferably have at least twenty four (24) APD's for processing interactive data such as IMTV, any data, signaling data, etc. Thus, even though FIGS. 3 and 4 show only a single APD, it will be appreciated that a plurality of APD's will be arranged in parallel, whereby each APD will receive a dedicated virtual path on the basis the a predetermined VPI/VCI range. In other words, each APD serves a predetermined range of VPI/VCI values on the dedicated virtual path. As such, each APD has an addressable range determined by the video manager 240, which instructs the PVC controller 248 to set up the dedicated virtual path corresponding to the addressable range of the APD.

As shown in FIG. 7, the preferred ATM packet demultiplexer 700, also referred to as an MPEG router, comprises an input processor 720, a service multiplexer (SM) 740, and a transport multiplexer (TM) 760. The input processor 720 comprises a SONET interface 722 that receives the OC-3C ATM stream from the corresponding SONET multiplexer 130 in the VNH 104 or the SONET multiplexer 170 in the LVAN 112. The interface 722 performs clock and frame recovery of the SONET frame, cell delineation, Header Error Check (HEC) verification, and deletion of unassigned or idle ATM cells. The ATM stream is output to an ATM cell processor 724 that performs ATM Adaptation Layer (AAL-5) processing to reassemble the ATM cell payloads and perform a CRC and length check. Specifically, the ATM cell processor 724 buffers cells until it finds a cell having an ATM cell Adaptation Unit (AAU) value of "0" in its header (first cell) and another cell having an AAU value of "1" in its header (last cell). The ATM cell processor 724 counts the number of cells from first to last to determine the type of adaptation used to map cells.

If the ATM cell processor 724 has captured five cells, the receiver pulls out the payload data and uses the CRC data to check for errors. If there are no errors, the original data is reconstructed from the appropriate bytes of payload data from the first four cells. Similarly, if the receiver has captured eight cells, the receiver pulls out the payload data, does the CRC based error check, and if there are no errors, the original data,also referred to as Payload Data Units (PDU), is reconstructed from the appropriate bytes of payload data from the eight cells.

The ATM cell processor 724 receives control information and routing information from a control processor 726. The control processor 726 performs general control functions for the APD 700, including transmitting and receiving messages from the Ethernet data network 200 via the 10-Base T control signal path. Each of the APD's in a VNH or an LVAN have a specific IP address, enabling individual addressing of each APD via the Ethernet data network in the respective office. The control processor 726 may also have a Craft interface for diagnostic use by a service technician, and an Alarm interface for communication of alarm status.

After reassembling the payloads from the ATM cell stream, the ATM cell processor 724 determines from the corresponding VCI value of the VPI/VCI if the PDU's carry out-of-band signaling data or in-band (broadband) data. If the PDU's are carrying out-of-band signaling data, the PDU's are passed to the out-of-band (OOB) signal processor 728. The OOB signal processor 728 recovers the out-of-band signaling messages from the PDU's, encapsulates the messages in MPEG format, assigns a PID value, and performs 1.544 MB/s framing before output as a RS-530 signal to the QPSK modulator. The PID assignment by the OOB signal processor 728 is based on the ten least significant bits of the virtual circuit identifier of the VPI/VCI, and the routing information supplied from the control processor 726. If the signaling data is for a specific VIU, the PID value will correspond either to the DET address for DET signaling information, or to the NIM network address for NIM signaling information.

If the ATM cell processor 724 determines that from the corresponding VCI value that the PDU's carry broadband data, the PDU's carrying broadband data are output to the service multiplexer (SM) 740. Specifically, if the recovered data (PDU's) are carrying MPEG-format data, for example as a Single Service Transport Multiplex (SSTM), the PDU's carrying the SSTM's are supplied to an SSTM processor 742, where the MPEG-2 packets are extracted from the PDU's to recover the MPEG-2 packet stream.

As noted above, the MPEG packets carried in the ATM cells received by the APD 700 have PID values assigned by the respective VIP's encoding equipment. The MPEG-2 standard also requires that a packet stream containing packets relating to one or more programs includes a program association table in a packet identified by PID 0. The program association table maps each program source with the PID value associated with the program map related to that source. In accord with the standard, the VIPs' encoders will construct the MPEG packet streams for each program to include a PID 0 packet containing the program association table. The program streams also include a packet identified by a PID value in that table containing the program map for that program. Thus, the SSTM processor 742 can capture the program association table in packet PID 0 to identify the PID value for the program map from the source of programming and can capture the program map to identify the PID values applied by the source encoder to identify the data (if any), video and audio for the particular program. Alternatively, the SSTM processor 742 could be preprogrammed with the relevant PID values inserted by the VIPs' encoders. The translation table received by the APD controller 726 is used to map each PID value in the reconstructed packets of a particular program into a new PID value which is unique at least within the output stream of the particular output port of the APD, as a function of the VPI/VCI value of the received ATM cells.

For example, assume for convenience that the HBO program arriving at the APD consists of video packets with a PID value of 17 and audio packets with a PID value of 19. The program map is contained in a packet identified by PID value 3, and the program association table in packet PID 0 identifies PID '3' for the program map. The SSTM processor 742 recognizes all of the packets as originating from a single program source based on the VPI/VCI of the ATM cells and maps the PID values into new unique values, e.g. 27 for video and 37 for audio. The SSTM processor 742 also constructs a new program map containing the new PID values for video and audio and inserts the new map in a packet identified by PID value of 132.

The MPEG-2 packet stream is supplied by the SSTM processor 742 to a FIFO-based time recovery processor 744 in order to recover the MPEG-2 program clock reference (PCR) timing that may have been affected by jitter caused by network and front-end processing. The time-corrected MPEG-2 stream is then output to an access controller 746, which inserts a service control channel (SCC) bit stream carrying control information into each SSTM. The access controller also includes sixty-four (64) encryption processors for encrypting the SSTM's in accordance with the encryption information from the controller 748. The controller 748 receives the encryption information from the controller 726, which receives the downloaded encryption information from the ACC-4000D.

If the ATM cell processor 724 determines that the PDU's carry broadband data that is not MPEG format data, the PDU's carrying the "any-data format" messages are supplied to a signaling processor 750. The signaling processor 750 recovers the data messages (such as in-band signaling messages) from the PDU's, and performs MPEG processing to obtain the in-band signaling MPEG-2 packet stream. The signaling processor 750 assigns PID values based on the least ten (10) significant bits of the VCI and the routing information supplied by the video manager via the control processors 726 and 748. The in-band signaling MPEG-2 packet stream is then supplied to the access controller 746.

The access controller 746 outputs the combined and encrypted in-band (broadband) MPEG streams to the transport multiplexer 760, which includes a transport MUX 762, a TAXI interface 764, and a controller 766. The transport MUX 762 multiplexes the input MPEG streams to one of five output 27 MB/s transport streams in accordance with the routing information supplied by the controller 766 and the control processor 726. In addition, the transport MUX 762 monitors PID faults, erroneous packets, loss packets, and redundant packets in each transport stream, and adjusts PCR values to compensate for packet movements due to the multiplexing of multiple SSTM's onto a single transport stream. Finally, the transport MUX 762 outputs the five 27 MB/s transport streams to a TAXI interface 764, which outputs the five 27 MB/s transport streams to the QAM modulators. TAXI is an output format used by Advanced Micro Devices, Inc.

According to the preferred embodiment, the maximum number of PID values that can be assigned by the APD 700 is preferably nine hundred (992). Each of the 64 encryption processors preferably can encrypt up to three (3) PID's; thus, the total number of PIDs assignable for encryption is 192. On average, one program uses three PID's for a video/audio/data stream, resulting in sixty-four (64) encrypted programs. Thus, there remains 800 available in-the-clear PID values. Since signaling messages require only one PID value, that allows 800 addressable out-of-band channels, some of which will be reserved as default signaling channels, the remainder being available for dynamic assignment, for example, for IMTV purposes.

As shown in FIG. 7, the OOB signal processor 728 and the in-band signaling processor 750 perform MPEG processing on uncompressed data transported by a received ATM cell stream. These processors, also referred to as packet address processors, assign PID values on the basis of the corresponding VCI within a predetermined VPI/VCI range, and in accordance with the routing information supplied by the video manager. Thus, the APD 700 is able to dynamically route data supplied by the ATM cell stream either to the in-band (broadband) channels or to the out-of-band (narrowband) channels, depending on the bandwidth requirements.

In some instances, the OOB signal processor 728 will also receive data from the controller 726 for transmission to a VIU via the default OOB signaling channel. For example, the controller 726 may supply encryption information downloaded from the ACC-4000D via Ethernet to the OOB signal processor 728 for downstream transmission on the OOB signaling channel. Thus, the OOB signal processor 728 is able to accept data for downstream OOB transmission via either a high-bandwidth path (ATM cell stream from the ATM cell processor 724), or the low-bandwidth path (Ethernet path).

Figure 8:
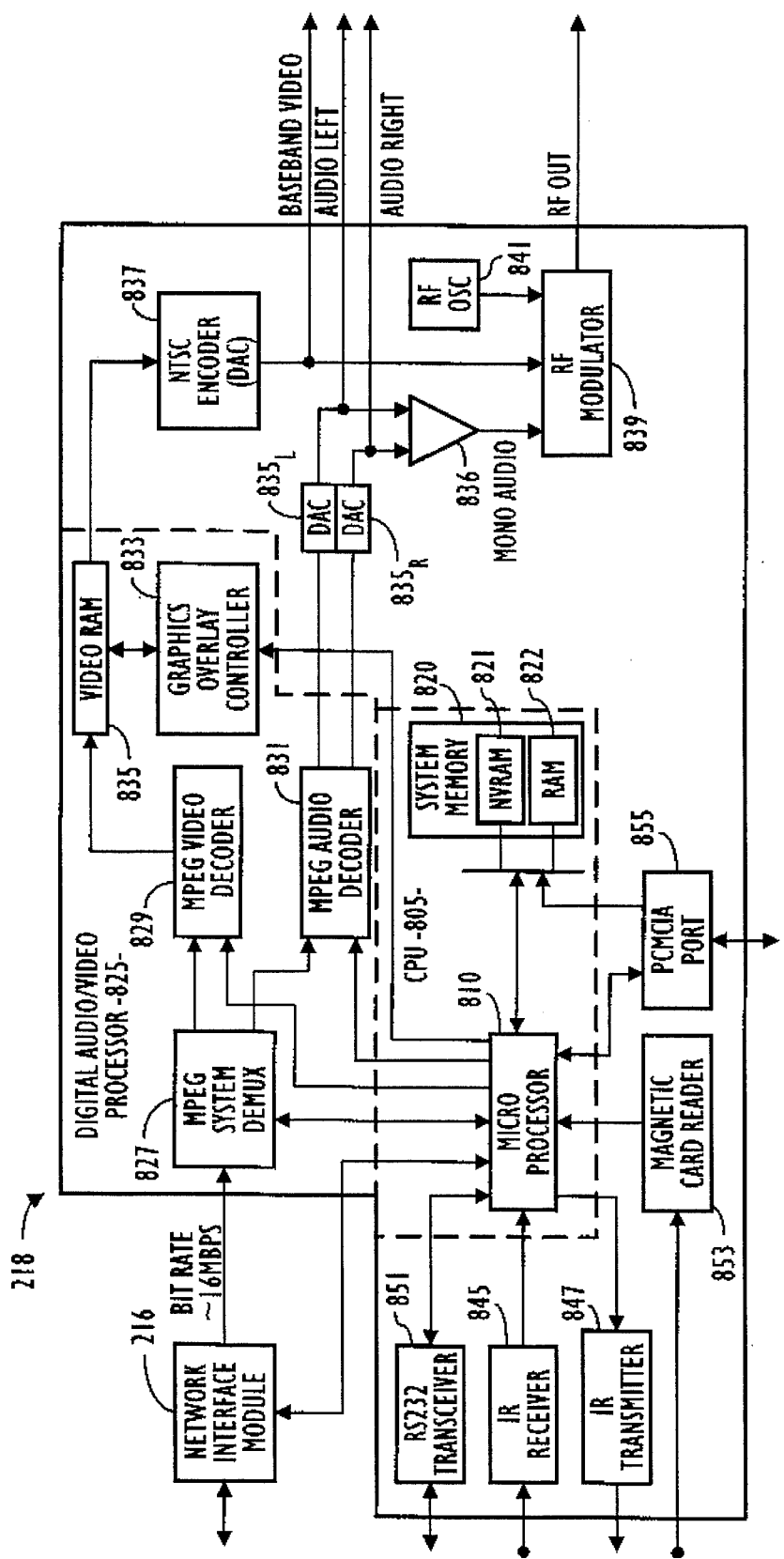
FIG. 8 is a block diagram of the digital entertainment terminal (DET) shown in FIG. 5.

FIG. 8 discloses a digital entertainment terminal (DET) 218 in accordance with a preferred embodiment of the present invention. In the illustrated embodiment, the DET 218 is coupled to the network interface module 216 by a high bit rate broadband connection and a low bit rate signaling connection. As discussed in detail below with respect to FIG. 9, the broadband connection is a one-way downstream only connection, but the low-bit rate signaling connection is a two-way connection, whereby the network interface module 216 includes means to multiplex and demultiplex signals carrying signaling information for transmission/reception over a coaxial cable drop 212 shown in FIG. 5.

The network interface module 216 takes the form of a plug in module. In one embodiment, the NIM 216 would be similar to a daughter board or option card which can be plugged into a back plane of a personal computer (PC). In such an embodiment, typically a technician could replace the module in either the field or the shop, to modify a DET to connect to and communicate over a different network, and the technician would modify associated communications control software in the system memory. Alternative implementations may use a user replaceable cartridge type network interface module, similar to a video game cartridge, which may include memory in the module for storage of the communications control. As a further alternative, the network interface module could include a digital signal processor controlled by the CPU of the DET and input/output connections compatible with all of the digital broadband networks currently available. The downloaded operating system software stored in the system memory of the DET would control operations of the digital signal processor to send and receive signals in accord with the particular network the subscriber chooses to connect the DET to.

The DET 218 includes a CPU 805, comprising a 386 or 486 microprocessor 810 and associated system memory 820. The system memory 820 includes at least 2 Mbytes of volatile dynamic RAM 822 and 1 Mbyte of non-volatile RAM 821. The microprocessor 810 includes a small amount of ROM (not shown) storing "loader" programming needed to control wake-up. An EPROM memory (not shown) also may be added.

A digital audio/video signal processor 825, controlled by the CPU 805, produces digital uncompressed audio and video signals from the audio and video MPEG encoded packets received from the network through the interface module 216. The audio/video processor 825 includes an MPEG system demultiplexer 827, an MPEG video decoder 829, an MPEG audio decoder 831, a graphics overlay controller 833 and at least two frames (e.g. 8 mbytes) of video RAM 835.

The MPEG system demultiplexer circuitry 827 recognizes packets in the MPEG data stream received over the broadband channel through the network interface module 216 and routes the packets to the appropriate components of the DET. For example, the MPEG system demultiplexer 827 circuitry recognizes audio and video packets in the MPEG data stream and routes those packets to the decoders 829, 831, respectively.

The MPEG video decoder 829 decompresses received video packet signals to produce a digital video signal, and the MPEG audio decoder 831 decompresses received audio packets to produce left and right digitized stereo signals. For at least some functions, the MPEG decoders 829, 831 may be controlled in response to signals from the microprocessor 810. The MPEG video decoder 829 will internally include at least two frames (e.g. 8 mbytes) of RAM (not separately shown) for use as a frame reorder buffer during the MPEG video decoding process, and the MPEG audio decoder 831 also may include some buffer memory.

The video RAM 835 is not a specialized "video RAM" as that term is sometimes used in the television art. The RAM 835 is actually a standard digital data RAM, of appropriate size, which is used in the DET to store digitized frames of video data. The RAM within the MPEG video decoder 829 likewise consists of standard digital data RAM.

The graphics display generator produces displays of text and graphics data, such as the initial turn-on selection menu received over the signaling channel, in response to instructions from the CPU 805. The video RAM 835 sequentially receives each frame of digitized, uncompressed video information, as output from the MPEG video decoder 829. The video RAM 835 also receives digital information and read/write control signals from the graphics overlay controller 833 representing the several planes of text and graphics information and combines that information with the frames of decompressed video to produce composite video frames.

The graphics overlay controller 833 and the video RAM 835 actually cooperate to manipulate five different planes of video information, four of which can be active at any one time, to produce the composite video frame output signals. The individual planes comprise the decoded MPEG video frames, a cursor, two graphics/text image planes manipulated by the microprocessor 810 and a backdrop plane. The backdrop plane would be switched in to replace the plane representing the decoded MPEG video frames, e.g. to present a blue background instead of the MPEG video background.

When there are no graphics or text, the composite frames would correspond entirely to the uncompressed received video frames output by the MPEG video decoder 829. When no received video frames are to be output, either when none are received or when they are to be entirely replaced, the information from the graphics overlay generator 833 would specify a background and the active planes of text or graphic information. When received video frames are combined with text and/or graphics, the composite video frames include the uncompressed received video frames with selected pixels thereof replaced with graphics or textual data display pixels specified by the graphics overly controller 833. In this last situation, the graphics overlay controller would deactivate the backdrop plane.

Under certain circumstances, the video RAM 835 also serves to freeze video frames. For example, when a video transmission ends for some reason, the RAM 835 will contain the video and associated graphics information for the frame last received and displayed. The DET can continue to output this frame as a still video output signal for some period of time.

The DET also includes audio and video digital to analog converters and appropriate drivers to produce output signals compatible with a conventional television set. Specifically, the converter and driver circuitry of the DET 218 includes audio digital to analog converters (DAC's) $835_L$, $835_R$, an audio mixer 836, an NTSC encoder 837, and an RF modulator 839.

The DAC's $835_L$ and $835_R$ receive the uncompressed left and right digitized audio signals output by the MPEG audio decoder 831. In response, the DAC's $835_L$ and $835_R$ produce baseband analog audio signals for output to individual baseband output terminals. The audio mixer 836 also receives the baseband audio signals from the DAC's $835_L$ and $835_R$. The mixer 836 combines the left and right analog audio signals to produce a monaural audio signal as the audio input to modulator 839.

The NTSC encoder 837 also performs a digital to analog converter (DAC) function. In response to the digitized video output signals from the video RAM 835, the NTSC encoder 837 produces a baseband analog video signal in standard NTSC format. The baseband NTSC video signal is supplied to an output terminal of the DET 218. The baseband NTSC video signal is also supplied to the RF modulator 839. The RF modulator 839 responds to the mono audio signal, the NTSC video signal and an RF signal from a local RF oscillator 841, to produce a standard RF television signal on an available TV channel, typically channel 3 or channel 4.

The DET 218 of the present invention may also include a number of additional interface devices. In the example illustrated in FIG. 8, the DET 218 includes an IR transmitter 847 that responds to digital data signals from the microprocessor 810 and outputs corresponding IR signals for wireless transmission. The IR transmitter 847 and IR receiver 845 may operate together to provide a two-way wireless data communication link to some remote device, such as a personal data assistant (PDA) or pocket organizer. Alternatively, the IR transmitter may send signals to a remote display device for use in a service not requiring the TV set. For example, in an audio on demand service, the IR transmitter would send display data to an LCD display located near the user's stereo system.

The illustrated DET also includes an RS-232 transceiver 851 connected to the microprocessor 810. An RS-232 port is a standardized two-way serial data interface typically used for connecting computers to peripheral devices, such as modems. In the present system, the RS-232 transceiver 851 might provide a serial data connection to an external personal computer (PC), such that the DET permits communications between the PC and the Video Dial Tone network. Alternatively, this port might connect the DET to a printer, e.g. to print coupons during home shopping/browsing services. A hand-held diagnostic terminal would also connect to this port during servicing of the DET. The communications and protocols offered by the DET through the transceiver 851 would be controlled by the operating system and applications program software downloaded into the system memory 820.

FIG. 8 also shows the DET 218 including a magnetic card reader 853 connected to the microprocessor 810. This reader 853 could be used to scan credit card information encoded on magnetic strips on commonly available credit cards. In a home shopping and purchasing service, controlled by the downloaded software, the user would scan their own credit card through the magnetic card reader 853 as part of the payment operations. The reader could also have magnetic write capabilities to perform debit card operations.

The illustrated DET 218 further includes a personal computer memory-card interface adapter (PCMCIA) port 855. This is a two-way interface for connection to and communication with a flash memory module, such as is now incorporated into advanced "smart card" devices. In a medical service, a user might communicate with a medical information database through the DET 218 and the broadband network. The user's personal medical history information could be read from the smart card and subsequently updated on the smart card, through the PCMCIA port 855. Another use, of this port might involve communication to a connected video game system to download video game software to the video game system and/or play interactive video games. Although specified as a "memory" port and mapped by the CPU as part of its system memory space, the devices connected to this port 855 can have other data processing capabilities, e.g. buffering and modem communication capability.

In the current implementation, the PCMCIA port 855 will carry 6 Mbits/s of data, but the port can be designed for higher speeds such as 20 Mbytes/s. Another use of this port would be for connection to an Ethernet card or other Local Area Network (LAN) card to permit data communications between the DET and one or more computers. The DET would provide the computers with communications services through the broadband network, for example to receive high speed downloads of new or updated software for those computers. Although similar functions are possible through the RS-232 transceiver 851, the data rate through the PCM-CIA port 855 is much higher.

Figure 9:
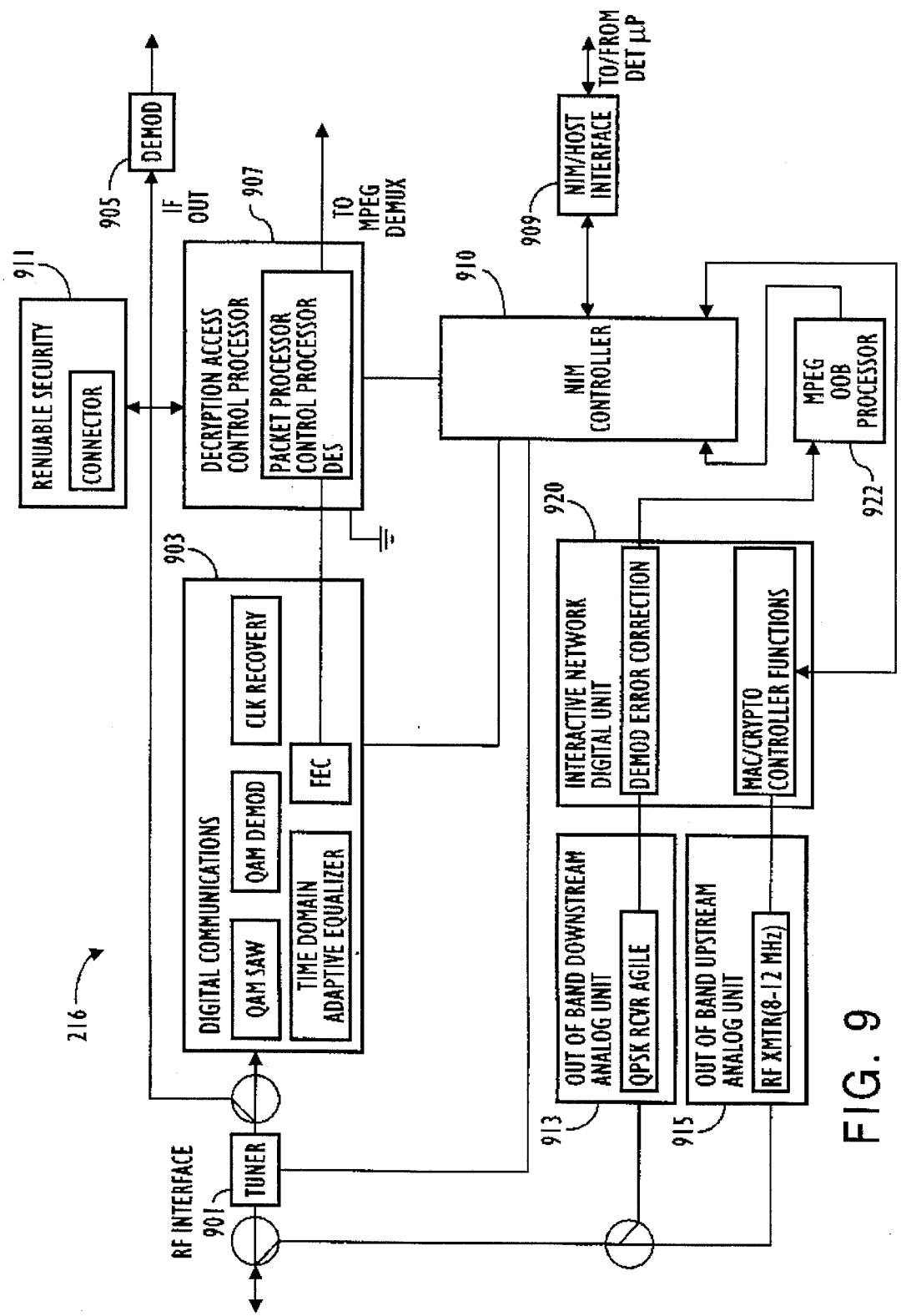
FIG. 9 is a detailed block diagram of the network interface module (NIM) shown in FIG. 8.

FIG. 9 depicts a NIM 216 for interfacing with the DET 218 to the network as shown in FIGS. 2 and 5. The structure illustrated is based in part on the preference for the QAM modulation techniques for the digital video (broadband) signals and QPSK modulation techniques for the signaling data (narrowband) signals in the disclosed network. The input to the NIM is a broadband RF signal provided from the coaxial distribution drop. The tuner 901 selects a specific 6 MHz channel from the broadband input spectrum and presents it at an intermediate frequency to the digital communications section 903, and through the IF output port to an analog video/audio demodulator 905. Although-illustrated as part of the NIM, the demodulator may be an element of the host DET. The baseband audio video signals are selectively supplied as alternate outputs to the baseband output terminals and as alternate inputs to the RF output modulator 839 (see FIG. 8). The QAM demodulator block performs adaptive equalization, demodulation and forward error correction on signals in a specified one of the digital channel slots from the tuned RF channel and outputs a corrected serial baseband digital feed. The decryption processor 907, when properly authorized by the video manager and the ACC-4000D, decrypts packets identified by selected MPEG PIDs, as directed by the DET microprocessor, via the host interface 909 and the NIM controller 910. The composite MPEG transport multiplex with appropriately decrypted components is output from the NIM 216 to the host DET's demultiplex and decompression circuitry as shown in detail in FIG. 8.

In the illustrated preferred embodiment, communication between the host microprocessor 810 and the NIM 216 is via a dual port memory connected as the NIM host interface 909. The shared memory provides mailboxes and buffer regions which are used to transfer messages and commands between the host microprocessor and the NIM 216. Messages passing through this link include interactive traffic to the level 1 and 2 gateways, tuner control commands, specification of appropriate PIDs for decryption, general housekeeping data, etc.

The RF tuner 901 translates the desired channel, containing either digital or analog information, to a 43.75 MHz IF signal. The IF signal contains either digital or analog information. The tuner 901 utilizes a dual conversion technique with synthesized local oscillators, and has an input tuning range of 50 MHz to 860 MHz.

The 64 QAM demodulator comprises three submodules: DMAU, DMDU, and FEC. This module demodulates the QAM signal to digital form, and performs forward error correction (FEC) decoding, and it provides a baseband digital signal to the Decryptor Module. The DMAU contains the SAW filter, the QAM demodulator, carrier and clock recovery loop components and AGC control signal generation for the tuner 901. The DMDU contains an adaptive equalizer, AGC control signal generation for the DMAU, and error generation functions for the clock and carrier recovery loops. The FEC module executes concatenated Viterbi (Trellis) and Reed Solomon error correcting functions.

The Decryptor Module 907 receives the baseband digital data information stream from the demodulator, and control/authorization information from the NIM controller 510. When authorized, this module 907 decrypts the packets identified by appropriate PIDs in the data stream. The high speed data containing decrypted packets is then passed out of the NIM to the host terminal. This module employs a DES type decryption algorithm and a key hierarchy to provide access control and decryption. The specific algorithms may be modified through the use of a TV Pass Card which is inserted in the renewable security slot 911.

The physical layer interface between the NIM 216 and the local loop coax drop comprises a 64 QAM in-band transport multiplex receiver and the frequency agile QPSK out-of-band receiver 913 illustrated in FIG. 4. A frequency agile QPSK transmitter 915 relays the upstream signal over an assigned default channel and/or dynamically assigned upstream signaling channels, typically in the 8–12 MHz band on the coaxial drop. The out-of-band receiver 913 monitors QPSK signals on an assigned downstream default signaling channel. Downstream signals on the default downstream signaling channel are demodulated by the receiver 913 and forwarded to the interactive network digital unit 920 for error correction. The MPEG-encoded out-of-band signals are then output to an MPEG out-of-band (OOB) processor 922. If the received MPEG-encoded signals have a PID value corresponding to the NIM network address or the DET address, the MPEG OOB processor 922 performs MPEG processing to recover the signaling data from the MPEG packets, and outputs the data to the NIM controller 910. If the data from the MPEG processor 922 is DET signaling data, the NIM controller 910 supplies the signaling data to the DET microprocessor via the NIM/Host interface 909; if, however, the data from the MPEG processor 922 is NIM signaling data, then the NIM controller 910 processes the NIM signaling data accordingly.

Operation of the network will now be described. The video manager 240 controls all routing of broadband and narrowband data throughout the network in response to bandwidth requirements supplied from the level 1 gateway 108. For example, in the case of broadcast services such as pay-per-view, the broadcast VIP 114 may desire to broadcast broadband data to be transported by the network. As shown in FIG. 6, the broadcast VIP 114 communicates with the level 1 gateway 108 via the ATM backbone subnetwork 106 to exchange interactive broadcast signaling information in order to request a specified bandwidth at a scheduled time, e.g., for a pay per view event. Alternatively, the broadcast VIP 114 may communicate with a business office in the network, whereby the broadcast information is loaded from the business office into the level 1 gateway 108. The level 1 gateway 108 will send an instruction at the scheduled time to the video manager 240 that bandwidth is required for a specified duration for an ATM stream having a specified VPI/VCI header from VIP to the broadcast consolidation section 100 disclosed in FIG. 2. In response thereto the video manager 240 sends signaling messages, also referred to as routing messages, throughout the network to establish the bandwidth: and the ATM packet demultiplexer 134 is loaded with the appropriate translation tables identifying PID values to map the ATM stream to an MPEG stream having a specified MPEG format. The video manager 240 will also send an instruction to the ACC-4000 242 to send an encryption key to the ATM packet demultiplexer 134 to encrypt the program before RF transmission to the LVANs 112.

The ACC-4000 242 also sends the encryption key to the NIM 216 by downloading via the ATM backbone subnetwork 106 the encryption key to the LVAN 112 serving the VIU. The ACC-4000 242 may download the encryption key using a high-bandwidth or low-bandwidth virtual path in the ATM subnetwork 106. Preferably, the encryption key is downloaded on a low-bandwidth virtual path via the Ethernet data network 200 to the MPEG router/APD 174. The APD 174 recognizes the Ethernet message as signaling data for the DET on the basis of the E.164 address corresponding to the received message. The APD 174 performs MPEG processing on the encryption key within the Ethernet message and assigns a PID value corresponding to the NIM address on the basis of the routing information previously stored in the APD 174. The APD 174 outputs the MPEG stream in accordance with the routing information for that NIM to the QPSK modulator 178 for transmission on the assigned downstream default signaling channel. At the customer premises, the NIM 216 continuously monitors the assigned downstream default signaling channel for network signaling information. Upon recognizing the MPEG stream having the NIM's assigned PID value, the NIM 216 performs MPEG processing to recover the encryption key.

If an unauthorized user wishes to subscribe to the VIP 114, the user will use the DET 218 to request a session with the Level 1 gateway 108 in order sign up for the video service. Thus, the DET 218 will send a request for a Level 1 gateway session upstream to the LVAN 112 via the fiber node 202. The LVAN 112 uses the RF splitter 190 to split the combined RF signal from the fiber node 202, and supplies the request to the network controller 194 via the demodulator 192. The network controller identifies the VIU request as a request for the level 1 gateway 108, and outputs the request for the level 1 gateway 108 via Ethernet 200 to the ATM router 196, which packets the request with the appropriate VPI/VCI value in order to reach the level 1 gateway 108 along a dedicated virtual path within the ATM subnetwork 106.

As shown in FIG. 6, the VIU request is supplied from the LVAN 112 to the level 1 gateway 108 via the ATM switch 252. Although not shown in FIG. 6, the VDT Control Center 246 includes a corresponding ATM router to repacket the ATM cells and supply the request to the Level 1 gateway.

The level 1 gateway 108 sends a menu and a banner through the ATM backbone subnetwork 106, to the LVAN 112 along the unidirectional high-bandwidth virtual path (OC-3) to the LVAN's SONET multiplexer 170. The APD 174 recovers the video user signaling data from the ATM stream and performs MPEG processing by packeting the menu and banner in MPEG-2 packets having PID values generated in accordance with the VPI/VCI of the ATM stream and the routing information downloaded from the video manager. In accordance with the routing information stored in the APD 174, the MPEG packets carrying the level 1 gateway information is output to the QPSK modulator for transmission to the DET along the VIU's default narrowband signaling channel.

According to the preferred embodiment, the menu is a screen of text listing VIP's available to this customer or the VIP's that the customer has previously selected for purposes of her customized menu presentation. The subscriber reviews the menu on their television set, and operates the arrow keys on the DET remote control to move a cursor across the menu to an appropriate point on the screen, after which the user presses an <ENTER> key on the keypad or remote control. In response to the VIP selection input, the DET transmits an appropriate data signal upstream through the network to the level 1 gateway 106.

The level 1 gateway 108 may execute a PIN number access routine, if the subscriber has previously requested such access control for selected ones of the VIP's. For simplicity here, it is assumed that the currently selected VIP is not subject to such a PIN number requirement. The level 1 gateway is merely expecting to receive the VIP selection input from the DET 238 within a predetermined period following the menu transmission. If the level 1 gateway 108 receives the selection input message from the DET within a predetermined period, the level 1 gateway 108 begins tracking billing for that user, and instructs the video manager 240 that the VIU is an authorized user. The video manager 240 thereafter instructs the ACC-4000 242 to supply an encryption key to the VIU for the broadcast VIP 114, thereby enabling the VIU to de-encrypt the MPEG data from the VIP.

The VIU will also access the level 1 gateway 108 as described above in order to initiate an IMTV session with an IMTV VIP 260. The IMTV VIP 260 shows in more detail the IMTV components in the VIP 116 discussed above with respect to FIG. 2. As shown in FIG. 6, the IMTV VIP 260 includes a Level 2 gateway 262 for communication with the Level 1 gateway 108 via the ATM backbone subnetwork 106, and an IMTV server 264 for outputting broadband video data in ATM streams to the ATM backbone subnetwork 106. To establish a broadband communication session or connection through the network between the level 2 gateway 262 and a particular DET 238 requires establishment of a virtual circuit through the ATM switch 252 and the appropriate LVAN 112. In the network of FIG. 6, the PVC controller 248 stores data tables defining all possible virtual circuits through the ATM switch 252 to the LVANs 112. The data tables in the PVC controller 248 define the header information and the particular fiber output port used to route cells to the correct LVAN 112 on unidirectional virtual paths (high-bandwidth) or bidirectional virtual paths (low-bandwidth). The data tables thus define "permanent virtual circuits" (PVC's) between the providers and LVAN 112 servicing the DET's.

When the level 1 gateway 108 receives the request for an IMTV session with a selected VIP, the level 1 gateway 108 connects with the Level 2 gateway 262 of the selected VIP via the ATM subnetwork 106 and asks the Level 2 gateway 262 if it wishes to establish an IMTV session with the requesting VIU; if the level 2 gateway 262 declines the request, the level 1 gateway 108 terminates the connection. If, however, the level 2 gateway 262 acknowledges the request from the level 1 gateway 108, the level 1 gateway 108 specifies the necessary bandwidth to the video manager 240 and the PVC controller 248. In addition, the level 1 gateway 108 instructs the level 2 gateway 262 what VCI value should be added to the output ATM stream from the IMTV server 264, assuming that the IMTV VIP 260 has a predetermined VPI address.

The video manager 240 and the PVC controller 248 maintain an inventory of bandwidth in use and available bandwidth throughout the ATM subnetwork 106, throughout each VNH 104, and each LVAN 112. Referring to FIG. 4, the Level 1 gateway 108 sends an instruction that a certain amount of bandwidth is needed for an IMTV session between the IMTV VIP 260 and a VIU. For example, the Level 1 gateway 108 may specify a rate of 1.5 MB/s, 3 MB/s, 6 MB/s, up to 15 MB/s; since one 6 MHz program channel can carry up to 27 MB/s, the APD 174 can arrange one 15 MB/s stream per channel, four 6 MB/s streams per channel, eight 3 MB/s streams per channel, or sixteen 1.5 MB/s streams per channel. In response to the instruction from the level 1 gateway 108, the PVC controller 248 sets up the downstream virtual path through the ATM backbone subnetwork 106 for broadband data from the IMTV server 264 to one of the ten (10) APD's 174 of the LVAN 112. The video manager 240 sets up the path downstream of the APD by loading that APD 174 with the VPI/VCI of the ATM stream to be received from the ATM backbone subnetwork 106, as well as the translated PID values to be inserted into the repacketed MPEG packets. The video manager 240 also instructs the APD 174 which output rail to place the MPEG packets on. Thus, the video data from the 264 is transmitted to the DET as MPEG packets having specific PID values.

If the broadband communication connection is successfully established between the VIP's server port 264 and the customer's DET 218, the video manager 240 transmits back an appropriate indication thereof to the level 1 gateway 108 for billing purposes. The level 1 gateway 108 responds to the VIU request by a level 1 gateway session to provide to the DET the connection block descriptors for the downstream video path from the level 2 gateway, including RF channel and PID value. The level 1 gateway informs the level 2 gateway 262 that it has set up a good broadband link, and the level 1 gateway 108 initiates a billing record for the call. Alternatively, if the video manager 240 informs the level 1 gateway 108 that it could not establish the broadband connection, the level 1 gateway passes that information on to the level 2 gateway and provides an appropriate message for display by the DET informing the customer.

During the communication session between the subscriber and the IMTV VIP 260, the DET 218 can transmit control signalling upstream through the ATM subnetwork 106 to the level 2 gateway IMTV VIP 260. The level 2 gateway IMTV VIP 260 can also send signaling information, such as control data and text/graphics, downstream through the same path to the DET. For downstream transmission, the server 264 will provide ATM cells with an appropriate header. The ATM switch 252 will route the cells using the header and transmit those cells to the APD 174 serving the requesting subscriber 236 for conversion to MPEG format. Typically, the downstream signaling from the VIP is included as user data (in-band) as part of the broadband MPEG packet stream transmitted to the DET.

When an interactive broadband session ends, e.g. as indicated by an exchange of appropriate messages between the DET 218 and the level 2 gateway 262, the level 2 gateway 262 instructs the level 1 gateway 108 to tear down the broadband connection. The instruction includes the customer's billing telephone number and the server port identification for the VIP port used for the broadband communication. In response, the level 1 gateway 108 stops the billing timing for that broadband session and transmits an instruction through the PVC controller 248 and the video manager 240 to tear down the broadband connection between the server port and the customer's broadband port. The level 1 gateway 108 creates a log record of the interactive broadband call for purposes of billing the IMTV VIP 260 for the broadband connect time. A more detailed description of the level 1 gateway functionality is found in commonly-assigned copending application Ser. No. 08/304, 174, filed Sep. 12, 1994 (attorney docket No. 680-093), the disclosure of which is incorporated in its entirety by reference.

A description will now be given for activation of a new customer (VIU). When a party requests activation of a new customer (typically requested by a VIP selling video services to new subscribers or a contractor selling DET's to consumers), that party sends an activation request to the network company's operations support system (OSS). That request includes a variety of customer related information, as well as the number of DET's this customer is purchasing. The OSS will assign and return an E.164 address for each DET. The party activating the DET's will enter the respective E.164 address into each DET, using the remote control, the television display and an initialization routine programmed into the DET. The entered E.164 is thereafter considered the DET's global ID.

As discussed above with respect to FIG. 5, each DET will connect into a fiber node 202 serving up to 500 homes. One video manager 240 as shown in FIG. 6 will control a number of fiber nodes 202 through the respective LVAN's. For each DET of the new customer, the OSS will transmit a message to the level 1 gateway, which sends an activation request to the video manger 240 that will service the customer. This activation request provides necessary information for activating service, including the node ID for the new customer and the E.164 address of each DET 218, to the video manager 240.

According to the preferred embodiment, each DET 218 is assigned default channels for downstream signaling with the level 1 gateway 108, the ACC-4000 242, the elements of the local video access node 112 and the video manager 240, as well as for upstream signaling. The downstream default channel preferably provides each DET 16 kbits/s of signaling capacity within a 1.5 Mbits/s stream which is QPSK modulated by the QPSK modulator 178 shown in FIG. 4 into a portion of the RF spectrum not used for broadband transmission. Also, the NIM 216 of the DET 218 is assigned a default upstream signaling channel for sending signaling information upstream through the hybrid-fiber-coax loop distribution plant (FIG. 5) on an assigned channel outside the portion of the spectrum carrying the broadband transmissions. The upstream signaling channel is preferably 400 bits/s.

In response to the activation request from the level 1 gateway, the video manager 240 assigns default channels to each new DET. The video manager 240 also assigns VPI/VCI values for communications between the DET 218 and the level 1 gateway 108.

When the video manager 240 assigns the bandwidth for the default signaling channels, the video manager 240 gives the E.164 address and the QPSK values for the downstream default channel to the ACC-4000 242. The ACC-4000 242 in turn assigns a NIM network address to the new DET. The NIM network address is also correlated with the assigned upstream default channel bandwidth. In the presently preferred embodiment, the NIM network address represents a PID value for MPEG packets carried on the assigned downstream QPSK modulated signaling channel. The video manager 240 updates the APD 174 serving the new VIU by downloading routing information identifying the default downstream signaling channel and the NIM and DET network addresses serving as the default PID values. The ACC-4000 242 transfers the E.164 and the NIM network address to the QPSK modulator 178 for broadcast on the downstream default channel by sending the data to the APD 174 via the Ethernet connection 200.

As part of the initialization routine noted above, the DET 218 will generate an initialization menu for display on an associated television. As part of the resultant initialization procedure, the DET 218 will prompt for and receive a keyed input of the assigned E.164 address. The main portion of the DET 218 will transfer the E.164 address to memory in the NIM 216. When the user or technician connects the NIM 216 to the hybrid-fiber-coax distribution line, the new NIM 216 will scan for and capture the broadcast transmission containing the E.164 address and the NIM network address. The NIM 216 will also capture other relevant information, such as the channel assignments for the upstream and downstream default signaling channels.

After the NIM 216 is initialized with the network address etc., the DET 218 transmits back an acknowledgement signal to the video manager 240. The video manager 240 in turn provides appropriate information to the various network nodes, e.g. the level 1 gateway 108 and the ACC-4000 242, indicating that the DET 218 is now activated. The level 1 gateway 108 sets up a communication with the DET 218 and downloads via a high-bandwidth virtual path a default channel map and connection block descriptors for the channels the subscriber is permitted to receive. Similarly, the ACC-4000 242 sets up a communication with the DET 218 and downloads, preferably via the low-bandwidth virtual path, decryption keys for the channels the subscriber is permitted to receive. The decryption keys are stored in memory in the NIM 216. The level 1 gateway 108 and the ACC-4000 242 will update the data stored in the NIM/DET as necessary, e.g., if the subscriber changes the services to which she subscribes.

When the subscriber selects a digital broadcast channel, the main portion of the DET 218 supplies the RF channel number from the connection block descriptor for that channel to the NIM 216. The NIM 216 will tune to the identified channel, and the NIM 216 will use the encryption key from its memory to descramble the tuned RF signal. As a result, the NIM 216 passes digital signals from the RF channel through the interface to the main portion of the DET 218. In turn, the main portion of the DET 218 uses the PID value from the connection block descriptor to begin MPEG decoding of the selected program. Thus, for broadcast services, the DET/NIM stores all necessary permission data and can begin reception and decoding in response to a selection by the user, without any upstream signaling to any other node of the network.

The default channels and corresponding default VPI/VCI values provide dedicated two-way signaling communications from the DET 218 up as far as the level 1 gateway 108. For example, the DET 218 sends a message to the level 1 gateway by QPSK modulating the appropriate data in the upstream default channel. The network controller 197 shown in FIG. 4 receives the message and passes the message to the ATM router 196 which repacketizes the message as one or more ATM cells identified by the upstream default VPI/VCI value for communication with the level 1 gateway 108. The ATM router 196 sends the ATM cell(s) through the ATM switch network 106 to the level 1 gateway 108. For messages from that gateway intended for the particular DET, the level 1 gateway 108 formulates an ATM cell containing the downstream message data. This cell uses the downstream default VPI/VCI value. The ATM switch routes this cell through the APD 174 to the QPSK modulator 178 in the local video access node 112 serving this subscriber. The APD 174 repacketizes the data from the ATM cell payload as an MPEG packet data message bearing the NIM network address PID, and the QPSK modulator 178 transmits that message through the QPSK signaling channel for downstream default signal transport.

For a pay per view service, the level 1 gateway 108 transmits the connection block descriptor for the pay per view channel through the downstream default channel to the DET 218 at a specified preview time, e.g. 15 minutes before the event. The NIM will recognize the address in the broadcast on the its assigned default channel and capture the data packet. The NIM will strip off the address information and pass the connection block descriptor to the main portion of the DET 218 to permit the reception of the pay per view event channel if selected by the viewer. During the preview time, the NIM uses a first encryption key. The NIM 216 will not have the encryption key for this channel for the full event unless and until the viewer purchases the pay per view event. A subscriber negotiates with a VIP 114 to order a pay per view event in any of several possible ways. The VIP's equipment identifies the subscriber by E.164 address and sends an event number with the E.164 address to the ACC-4000 242. Before the start of the event, the ACC-4000 242 transmits a message to the DET 218 using the NIM network address via the default channel assigned to the particular DET 218. This message specifies start time, event duration and the encryption key needed to decode the selected event. The NIM 216 monitoring its default channel, recognizes its network address and captures the packet of message data for further processing. In the present case, the NIM 216 responds to the message by adding the encryption key for the program to its memory and stores the duration information. At the end of the specified duration, the NIM 216 deletes the encryption key for the program from its memory. At the appropriate times, the DET 218 will receive and decode the pay per view event in essentially the same manner as for other broadcast services, using the connection block descriptor and the encryption key.

As disclosed above, the present invention provides a distributed architecture designed to provide video services over a greater serving area, thereby minimizing the need for expensive signal processing devices. In addition, the present invention provides a network configuration that enables centralized control of network services and interfaces between video information providers and video information users. The transport of data throughout the centralized network is provided by the ATM backbone subnetwork, which enables broadband data and signaling communication between local video access nodes and network control systems and/or IMTV. Thus, the present invention is able to combine the respective advantages of centralized control processing and local distribution of video data for IMTV traffic.

While this invention has been described in connection with what is presently considered to be the most practical and preferred embodiment, it is to be understood that the invention is not limited to the disclosed embodiment, but, on the contrary, is intended to cover various modifications and equivalent arrangements included within the spirit and scope of the appended claims.

What is claimed is:

1. A network for transporting compressed, broadband data to a plurality of users, said compressed, broadband data being received from a plurality of information providers on corresponding digital signal paths as asynchronous transfer mode (ATM) cell streams having corresponding VPI/VCI identifiers, the network comprising:

a control center for assigning data transmission paths for said plurality of users, said control center outputting routing information for each data transmission to be transported to said users;

a broadcast consolidation section receiving signals from a first group of said digital signal paths and outputting a consolidated broadcast stream, said broadcast consolidation section comprising:

an ATM edge multiplexer receiving said ATM cell streams from said respective information providers and outputting a consolidated ATM cell stream, a digital encoder for converting received analog signals into digital signals, and a transport multiplexer for multiplexing said consolidated ATM cell stream and said digital signals into said consolidated broadcast stream;

a transport ring for transporting said consolidated broadcast stream;

a plurality of video network hubs (VNHs) distributed along said transport ring, each of said video network hubs receiving said consolidated broadcast stream and outputting a consolidated RF signal, each of said video network hubs comprising:
(i) a transport demultiplexer outputting said consolidated ATM cell stream and said digital signals from said received consolidated broadcast stream,
(ii) a first ATM demultiplexer for recovering said compressed broadband data from said consolidated ATM cell stream output by said transport demultiplexer, said first ATM demultiplexer comprising a packet address processor for outputting the recovered compressed broadband data as a plurality of data packet streams, each of said data packet streams being arranged on the basis of data packets having an identifier address assigned by said packet address processor on the basis of the VPI/VCI of corresponding ATM cells and first routing information from said control center,
(iii) means for receiving local broadcast signals,
(iv) means for recovering said analog signals from said digital signals output by said transport demultiplexer,
(v) means for modulating each of said data packet streams, said received local broadcast signals and said recovered analog signals to RF channel frequencies, respectively, on the basis of said first routing information,
(vi) a first RF combiner for combining modulated signals output by said modulating means into a consolidated RF signal, and
(vii) means for outputting said consolidated RF signal onto at least one optical fiber;

a plurality of local video access nodes (LVANs) distributed throughout a service area, each of said local video access nodes receiving local ATM cell streams and said consolidated RF signal and comprising:
(1) means for converting said consolidated RF signal on said optical fiber to an electrical consolidated RF signal,
(2) a second ATM demultiplexer, responsive to at least a first portion of said local ATM cell stream, for recovering video user data from said first portion of said local ATM cell stream for at least one of said users in accordance with second routing information from said control center, said second ATM demultiplexer comprising a second packet address processor for outputting the recovered video user data as a plurality of video user data packet streams, each of said video user data packet streams being arranged on the basis of data packets having an identifier address assigned by said second packet address processor on the basis of the VPI/VCI of corresponding ATM cells and said second routing information from said control center, said video user data packet streams being arranged for output at an RF channel frequency selected from a range of RF channels, comprising high-bandwidth data channels and low-bandwidth signaling channels, in accordance with said second routing information,
(3) a second RF combiner for combining said electrical consolidated RF signal and said video user data packet streams into a local RF signal, and
(4) means for supplying said local RF signal from said local video access node to a plurality of said users including said at least one user.

2. A network as recited in claim 1, wherein each of said supplying means comprises an optical converter for outputting said local RF signal as a local optical signal, said network further comprising:

a plurality of coaxial cables;

at least one fiber node receiving said local optical signal on an optical fiber from said local video access node and outputting said local RF signal to said coaxial cables; and a coaxial drop cable coupled to a tap of one of said coaxial cables for servicing a customer premises of said at least one user, said customer premises being assigned by said control center a default signaling channel from said low-bandwidth signaling channels and an identifier address to recognize corresponding video user data packet streams from said second ATM demultiplexer.

3. A network as recited in claim 2, wherein said second packet address processor of said second ATM demultiplexer comprises:

means for performing ATM cell adaptation layer processing to recover said video user data on the basis of said VPI/VCI of said first portion of said local ATM cell stream, said video user data comprising broadband data streams in MPEG format, in-band data streams, and out-of-band data streams;

an in-band signaling processor for processing said in-band data streams into a first MPEG stream of said data packet streams having PID values assigned on the basis of said corresponding VPI/VCI and said second routing information;

an out-of-band processor for processing said out-of-band data streams into a second MPEG stream of said data packet streams having PID values assigned on the basis of said corresponding VPI/VCI and said second routing information, said second MPEG stream being output for modulation to at least one of said low-bandwidth signaling channels;

a service processor for monitoring PID values of said broadband data streams in MPEG format, each of said broadband data streams in MPEG format output by said service processor having unique PID values; and a transport multiplexer for outputting said broadband data streams from said service processor and said first MPEG stream for modulation to at least one of said high-bandwidth data channels.

4. A network as recited in claim 3, wherein said network further comprises a network interface module (NIM) located at said customer premises and adapted to communicate with a digital entertainment terminal (DET) responsive to inputs from said at least one user, said NIM comprising:

an in-band RF receiver adapted to process said electrical consolidated RF signal and said broadband data streams and first MPEG stream within said selected high-bandwidth channel frequencies, said in-band RF receiver outputting to said DET at least one of said received local broadcast signals, said recovered analog signals, said data packet streams from said corresponding information providers, and said broadband data streams from said service processor and said first MPEG stream in response to a first tuning instruction;

an out-of-band RF receiver adapted to process signals within said low-bandwidth signaling channels and selectively output said second MPEG stream in response to a second tuning instruction;

means for recovering said out-of-band data stream from said second MPEG stream of said data packet streams having PID values corresponding to said identifier address of said NIM; and a NIM controller, responsive to said recovered out-of-band data stream, for outputting said first and second tuning instructions.

5. A network as recited in claim 4, wherein each of said LVANs further comprise a data network for receiving control information including said second routing information from said control center via a second portion of said local ATM cell stream, and an ATM router to recover said control information from said second portion of said local ATM stream.

6. A network as recited in claim 5, wherein said control center selectively outputs network control information to said local video access node on virtual paths transporting said first and second portions of said local ATM cell stream on the basis of high-bandwidth and low-bandwidth transport requirements, respectively.

7. A network as recited in claim 6, wherein said control information from said control center is supplied to said second ATM demultiplexer and comprises encryption information.

8. A network as recited in claim 7, wherein said encryption information is supplied by said data network to said out-of-band signaling processor for output to said NIM using said corresponding default signaling channel and said corresponding identifier address.

9. A network as recited in claim 8, wherein said NIM further comprises a decryption processor for decrypting outputs of said in-band RF receiver in accordance with a decryption key, said out-of-band RF receiver receiving said encryption information on said default signaling channel and outputting said second MPEG stream having said corresponding identifier address and carrying said encryption information, said out-of-band data stream recovering means supplying said encryption information to said NIM, said NIM outputting said decryption key in response to said supplied encryption information.

10. A network as recited in claim 6, further comprising a level 1 gateway adapted to communicate with said at least one user via at least one of said virtual paths, said local video access node further comprising means for transmitting upstream information from said at least one user to said level 1 gateway.

11. A network as recited in claim 10, wherein said level 1 gateway supplies network information to said local video access node for said at least one user via one of said virtual paths corresponding to said high-bandwidth transport requirement, said second ATM demultiplexer outputting user network data for said at least one user on one of said RF channels in accordance with said second routing information.

12. A network as recited in claim 1, wherein said second packet address processor of said second ATM demultiplexer comprises:

means for performing ATM cell adaptation layer processing to recover said video user data on the basis of said VPI/VCI of said first portion of said local ATM cell stream, said video user data comprising broadband data streams in MPEG format, in-band data streams, and out-of-band data streams;

an in-band signaling processor for processing said in-band data streams into a first MPEG stream of said data packet streams having PID values assigned on the basis of said corresponding VPI/VCI and said second routing information;

an out-of-band processor for processing said out-of-band data streams into a second MPEG stream of said data packet streams having PID values assigned on the basis of said corresponding VPI/VCI and said second routing information, said second MPEG stream being output for modulation to at least one of said low-bandwidth signaling channels;

a service processor for monitoring PID values of said broadband data streams in MPEG format, each of said broadband data streams in MPEG format output by said service processor having unique PID values; and a transport multiplexer for outputting said broadband data streams from said service processor and said first MPEG stream for modulation to at least one of said high-bandwidth data channels.

13. A network as recited in claim 12, wherein each of said LVANs further comprise a data network for receiving control information including said second routing information from said control center via a second portion of said local ATM cell stream, and an ATM router to recover said control information from said second portion of said local ATM stream.

14. A network as recited in claim 13, wherein said out-of-band processor receives said control information from said data network and outputs at least a part of said control information via said second MPEG stream for said at least one user.

15. A network as recited in claim 14, wherein said control center selectively outputs network control information to said local video access node on virtual paths transporting said first and second portions of said local ATM cell stream on the basis of high-bandwidth and low-bandwidth transport requirements, respectively.

16. A network as recited in claim 15, wherein said control information from said control center is supplied to said second ATM demultiplexer and comprises encryption information.

17. A network as recited in claim 1, further comprising an ATM subnetwork adapted to transport said first routing information to said corresponding video network hubs, and said local ATM streams and said second routing information to said corresponding local video access nodes, said control center further comprising a permanent virtual circuit (PVC) controller for maintaining high-bandwidth and low-bandwidth virtual circuits throughout said ATM subnetwork.

18. A network as recited in claim 17, wherein said second packet address processor of said second ATM demultiplexer comprises:

means for performing ATM cell adaptation layer processing to recover said video user data on the basis of said VPI/VCI of said first portion of said local ATM cell stream, said video user data comprising broadband data streams in MPEG format, in-band data streams, and out-of-band data streams;

an in-band signaling processor for processing said in-band data streams into a first MPEG stream of said data packet streams having PID values assigned on the basis of said corresponding VPI/VCI and said second routing information;

an out-of-band processor for processing said out-of-band data streams into a second MPEG stream of said data packet streams having PID values assigned on the basis of said corresponding VPI/VCI and said second routing information, said second MPEG stream being output for modulation to at least one of said low-bandwidth signaling channels;

a service processor for monitoring PID values of said broadband data streams in MPEG format, each of said broadband data streams in MPEG format output by said service processor having unique PID values; and a transport multiplexer for outputting said broadband data streams from said service processor and said first MPEG stream for modulation to at least one of said high-bandwidth data channels.

19. A network as recited in claim 18, further comprising a level 1 gateway adapted to communicate with said at least one user via at least one of said virtual circuits, said local video access node further comprising means for transmitting upstream information from said at least one user to said level 1 gateway.

20. A network as recited in claim 19, wherein said level 1 gateway supplies network information to said local video access node for said at least one user via one of said high-bandwidth virtual circuits, said second ATM demultiplexer outputting user network data for said at least one user on one of said RF channels in accordance with said second routing information.

21. A network as recited in claim 17, wherein said control center comprises:

an ATM router for passing signals between said control center and said ATM subnetwork;

a video manager generating said second routing information for each of said local video access nodes, said video manager assigning a communication channel from a specified local video access node to a specified user in response to a session request; and encryption storage means, responsive to encryption requests from said video manager, for downloading encryption keys to said second ATM demultiplexer serving a network interface module (NIM) of said specified user, said encryption keys being sent to said NIM via one of said low-bandwidth signaling channels.

22. A network as recited in claim 21, further comprising a level 1 gateway adapted to communicate with said at least one user via at least one of said virtual circuits, said local video access node further comprising means for transmitting upstream information from said at least one user to said level 1 gateway.

23. A network as recited in claim 22, wherein said level 1 gateway outputs an activation request for a new subscriber to said video manager via said ATM subnetwork, said video manager in response thereto downloading to said second ATM demultiplexer a default RF downstream signaling channel for signaling to a DET address corresponding to said new subscriber, and assigning a default RF upstream signaling channel for signaling from said DET address to said corresponding local video access node, said video manager outputting an activation signal to said encryption storage means, said encryption storage means in response thereto assigning a NIM network address corresponding to said new subscriber and downloading a predetermined set of encryption keys to said second ATM demultiplexer via said ATM subnetwork for transmission to said new subscriber.

24. A network as recited in claim 23, wherein said default RF upstream signaling channel transports a level 1 session request from said new subscriber to said corresponding local video access node, said local video access node outputting a level 1 gateway session request to said level 1 gateway via said ATM subnetwork, said level 1 gateway in response thereto outputting an ATM cell stream to said corresponding local video access node via said ATM subnetwork, said ATM cell stream from said level 1 gateway having a predetermined VPI/VCI value corresponding to a default virtual path, said second ATM demultiplexer of said corresponding local video access node converting said ATM cell stream from said level 1 gateway to an MPEG packet stream having a PID value and an assigned RF channel in accordance with said default RF downstream signaling channel, respectively.

25. A network as recited in claim 1, wherein said at least one user has a terminal adapted to access one of said packet streams on the basis of said corresponding identifier value.

26. A network for transporting video signals from a plurality of video sources to a plurality of video information users having digital entertainment terminals adapted to decode compressed data streams in accordance with stored connection block descriptors, the network comprising:

(I) a first collection node for receiving first video signals and ATM cell streams carrying compressed video packets from a first group of said video sources, said first video collection node comprising at least one ATM edge device for grooming said ATM cell streams from said first group of video sources into condensed ATM cell streams, encoders for outputting first digital video signals in response to said first video signals, and an optical multiplexer receiving said condensed ATM cell streams and said first digital video signals and outputting an optical transport signal;

(II) a plurality of optical fibers for carrying said optical transport signal;

(III) a plurality of video node hubs, each comprising a drop-and-continue optical multiplexer that receives said optical transport signal on a corresponding incoming optical fiber and outputs said optical transport signal on a corresponding outgoing optical fiber, said video node hubs and said optical fibers coupled to said video node hubs being arranged to form a unidirectional broadcast ring, each of said video node hubs further comprising:

(A) a plurality of ATM packet demultiplexers for reassembling said compressed packets from said corresponding plurality of condensed ATM cell streams carried by said optical transport signal and outputting said reassembled compressed packets on digital data streams, said reassembled compressed packets each having reassigned identifier values in accordance with a predetermined provisioning, (B) a plurality of modulators corresponding to said ATM packet demultiplexers for converting said digital data streams to corresponding first RF signals having specified channel bandwidths, (C) a second collection node for receiving second video signals from a second group of video sources, said second collection node comprising RF modulators for modulating said received second video signals to second RF signals, and (D) an RF combiner for combining said first and second RF signals into a hub RF signal;

(IV) a plurality of video end offices corresponding to each of said video node hubs, said video end offices corresponding to said each video node hub receiving said hub RF signal from the corresponding video node hub, each of said video end offices comprising:

(A) a third collection node for receiving third signals from a third group of sources and subscriber signaling information, said third collection node comprising:

(1) an MPEG packet router for outputting said third signals and subscriber signaling information including connection block descriptors as MPEG packet streams arranged on the basis of PID values controlled by said MPEG packet router in accordance with network routing information, and (2) RF modulators for modulating said MPEG packet streams to respective third RF signals, each of said RF modulators having a channel frequency selected from a range of RF channels including high-bandwidth data channels and low-bandwidth signaling channels, said MPEG router supplying said MPEG packet streams to said modulators in accordance with said network routing information, and (3) an RF combiner for combining said corresponding hub RF signal and said third RF signals into an end office RF signal; and (B) means for supplying said end office RF signals from said video end offices to corresponding video information users, a selected group of said video information users being able to selectively decode said MPEG packet streams in accordance with said subscriber connection block descriptors supplied to said selected group.

27. A network as recited in claim 26, further comprising an ATM subnetwork adapted to transport said third signals, said subscriber signaling information and data signals from an information provider to said third collection node, said MPEG router controlling said PID values in accordance with ATM identifier values associated with the signals transported to the third collection node.

28. A network as recited in claim 27, further comprising:

a permanent virtual circuit (PVC) controller coupled to said ATM subnetwork, said PVC controller establishing high-bandwidth and low-bandwidth virtual paths for an ATM stream to be transported through said ATM subnetwork; and a level 1 gateway in communication with said ATM subnetwork, said level 1 gateway adapted to establish communication between said third collection node and an interactive information provider supplying an interactive portion of said third signals via said ATM subnetwork.

29. A network as recited in claim 28, further comprising:

a video manager storing provisioning data for each of said video end offices, said supplying means, and said users serviced thereby, said video manager providing said network routing information to said MPEG router via one of said low-bandwidth virtual paths to establish a communication channel from a specified video end office to a specified user in response to a session request from said level 1 gateway; and encryption storage means, responsive to an encryption request from said video manager, for downloading encryption keys to a network interface module (NIM) of said specified user on one of said low-bandwidth signaling channels specified by said MPEG router.

30. A network as recited in claim 29, wherein said level 1 gateway outputs an activation request for a new subscriber to said video manager via said ATM subnetwork, said video manager in response thereto assigning in said MPEG router a default RF downstream signaling channel from one of said low-bandwidth signaling channels for signaling to a DET address corresponding to said new subscriber, and a default RF upstream signaling channel for signaling from said DET address to said corresponding video end office, said video manager outputting an activation signal to said encryption storage means, said encryption storage means in response thereto assigning a NIM network address corresponding to said new subscriber and downloading a predetermined set of encryption keys to said MPEG router via said ATM subnetwork for transmission to said new subscriber.

31. A network as recited in claim 30, wherein said default RF downstream signaling channel comprises a 16 kbits/sec signaling capacity, said corresponding video end office receiving downstream signaling data for said new subscriber via said ATM subnetwork.

32. A network as recited in claim 31, wherein said default RF upstream signaling channel transports a level 1 session request from said new subscriber to said corresponding video end office, said video end office outputting a level 1 gateway session request to said level 1 gateway via said ATM subnetwork, said level 1 gateway in response thereto outputting an ATM cell stream to said corresponding video end office via said ATM subnetwork, said ATM cell stream from said level 1 gateway having a predetermined VPI/VCI value corresponding to a default virtual path, said MPEG router of said corresponding video end office converting said ATM cell stream from said level 1 gateway to an MPEG packet stream having a PID value and an assigned RF channel corresponding to said default RF downstream signaling channel.

33. A network as recited in claim 29, wherein said video manager supplies to said ATM packet demultiplexers of said video node hubs said predetermined provisioning for said reassigned identifier values of said reassembled compression packets.

34. A network for transporting signals to a plurality of information users, comprising:

(I) a broadcast provider interface for receiving a plurality of broadcast signals from a plurality of broadcast information providers, said broadcast provider interface comprising:

(A) means for combining a first group of said broadcast signals into consolidated broadcast signals output as ATM cell streams, each cell having a specified VPI/VCI value, (B) a digital encoder for encoding a second group of said broadcast signals into digital broadcast signals, and (C) a multiplexer receiving said ATM cell streams and said digital broadcast signals and outputting multiplexed optical signals onto a unidirectional optical fiber;

(II) a plurality of broadcast headend nodes, each of said broadcast headend nodes receiving said multiplexed optical signals on a input fiber and outputting said multiplexed optical signals on an output fiber and being arranged to form a broadcast ring with said broadcast provider interface, each of said broadcast headend nodes comprising:

(A) an ATM converter for recovering said first group of broadcast signals from said ATM cell streams in accordance with said specified VPI/VCI values, (B) a decoder for recovering said second group of broadcast signals from said multiplexed optical signals, (C) receiver means for receiving a third group of broadcast signals, and (D) a plurality of modulators for modulating said first, second and third group of broadcast signals into a combined RF signal having respective channel frequencies;

(III) a plurality of video central offices arranged in groups, each group being served by a corresponding one of said broadcast headend nodes, each of said video central offices receiving said combined RF signal from said corresponding broadcast headend node and an ATM cell stream and comprising:
- (A) means for receiving local broadcast signals and outputting said local broadcast signals at central office RF channel frequencies,
- (B) an ATM demultiplexer for recovering video user data from said ATM cell stream for at least one of said users in accordance with routing information, said ATM demultiplexer comprising an ATM-to-MPEG processor for outputting the recovered video user data as a plurality of packet data streams, each of said packet data streams being arranged on the basis of data packets having an identifier address controlled by said ATM-to-MPEG processor on the basis of the VPI/VCI of corresponding ATM cells and said routing information, said packet data streams being arranged for output at an RF channel frequency selected from a range of RF channels, comprising high-bandwidth data channels and low-bandwidth signaling channels, in accordance with said second routing information,
- (C) a combiner for combining said output local broadcast signals with the combined RF signal from the corresponding headend node and the RF channels carrying said video user data packet streams to output a central office RF signal; and (IV) a local distribution network for supplying said central office RF signal for each of said video central offices to corresponding subscribers.

35. A network as recited in claim 34, further comprising an ATM subnetwork adapted to transport said ATM cell stream including interactive data in MPEG format in an ATM stream from an interactive information provider to said ATM demultiplexer of said video central office corresponding to said at least one user, said ATM-to-MPEG processor monitoring PID values of said interactive data in MPEG format.

36. A network as recited in claim 35, further comprising:
a permanent virtual circuit (PVC) controller coupled to said ATM subnetwork, said PVC controller establishing high-bandwidth and low-bandwidth virtual paths for ATM streams to be transported through said ATM subnetwork to said video central offices; and
a level 1 gateway in communication with said ATM subnetwork, said level 1 gateway adapted to communicate with a selected one of said video central offices and said interactive information provider via said ATM subnetwork.

37. A network as recited in claim 36, further comprising a video data center comprising:
an ATM router for passing signals between said video data center and said ATM subnetwork;
a video manager storing provisioning data for each of said video central offices, said local distribution network, and said users serviced thereby, said video manager outputting said routing information to assign a communication channel from a video central office to a specified user in response to a session request from said level 1 gateway; and
an encryption storage device, responsive to encryption requests from said video manager, that downloads encryption keys to said ATM demultiplexer for transmission via one of said low-bandwidth signaling channels to a network interface module (NIM) of said specified user.

38. In a network providing video services to a plurality of information users distributed throughout a serving area and comprising a broadcast network interface for receiving broadband data from a plurality of information providers, a plurality of video network hubs coupled to each other and said broadcast network interface via optical fibers, a plurality of video end offices arranged in groups served by a corresponding one of said video network hubs, said information users being arranged in groups served by a corresponding one of said video end offices, a method for transporting data to said information users, comprising the steps of:
grooming a first group of received broadband data carried as ATM cell streams from said information providers to obtain groomed ATM data streams;
combining said groomed ATM data streams with a second group of said received broadband data to obtain a consolidated broadband data stream;
outputting said consolidated broadband data stream from said broadcast network interface to each of said video network hubs;
in each of said video network hubs:
recovering said broadband data from said groomed ATM data streams carried by said consolidated broadband data stream,
outputting said recovered broadband data at a first channel frequency range and said second group of said received broadband data carried by said consolidated broadband data stream at a second channel frequency range,
combining the broadband data at said first and second channel frequency ranges with a third group of received broadcast data at a third channel frequency range to obtain a combined spectrum signal, and
supplying said combined spectrum signal to said video end offices corresponding to said each video network hub;
in each of said video end offices:
(1) receiving second ATM streams carrying local user data,
(2) performing ATM cell adaptation layer processing on said second ATM streams on the basis of the corresponding ATM cell identifier values to obtain compiled ATM cell payload data,
(3) performing MPEG processing of said compiled ATM cell payload data in an MPEG router to obtain MPEG streams having PID values assigned on the basis of the ATM cell identifier value of the corresponding compiled ATM cell payload data and network routing information,
(4) selectively outputting said MPEG streams from said MPEG router to RF modulators having a fourth channel frequency range comprising low-bandwidth channels and high-bandwidth channels, on the basis of said assigned PID values and said network routing information,
(5) combining the supplied spectrum signal from the corresponding video network hub with the output of said modulators operating within said fourth channel frequency range to obtain a combined video end office signal, and
(6) supplying said combined video end office signal to said corresponding group of information users.

39. A method as recited in claim 38, further comprising the step of establishing with a permanent virtual circuit (PVC) controller a virtual path for an ATM stream to be transported through an ATM subnetwork.

40. A network comprising:
- a broadcast provider interface receiving digital signals from a plurality of broadcast information providers, said broadcast provider interface comprising:
  - (1) means for combining ATM cell streams having specified VPI/VCI values and each containing one of the digital signals into a consolidated broadcast signal, and
  - (2) means for optically transmitting the consolidated broadcast signal;
- a plurality of broadcast headend nodes receiving the optically transmitted consolidated broadcast signal, each broadcast headend node comprising:
  - (i) at least one ATM converter receiving two or more ATM cell streams having specified VPI/VCI values and recovering two or more of the digital signals from the received ATM cell streams,
  - (ii) at least two modulators, each modulator modulating a recovered digital signal onto an assigned channel,
  - (iii) a combiner combining modulated channel signals from the modulators into a first combined spectrum signal, and
  - (iv) means for optically transmitting the first combined spectrum signal;
- groups of central offices, each group of central offices receiving an ATM stream of data and the first combined spectrum signal from a broadcast headend node servicing the group, each central office comprising:
  - (a) means for selectively outputting said data carried by said ATM stream as a MPEG packet stream within a specified spectrum channel, said MPEG packet stream having a PID value, said PID value and said specified spectrum channel being selected on the basis of an identifier of said ATM stream and network routing information, said specified spectrum channel being selected from one of a plurality of narrowband signaling channels and broadband data channels;
  - (b) a combiner combining the MPEG packet stream with the received first combined spectrum signal to form a second combined spectrum signal, and
  - (c) means for transmitting the second combined spectrum signal; and
- for each central office, a local distribution network transporting the second combined spectrum signal from that central office to a group of user terminals.

41. A network as recited in claim 40, further comprising an ATM subnetwork adapted to transport interactive data in said ATM cell stream from an interactive information provider to said selectively outputting means (a) of one of said central offices corresponding to said at least one user.

42. An ATM demultiplexer for supplying broadband data and narrowband data, received as corresponding ATM cell streams having respective VPI/VCI values, to a user, comprising:
- an ATM processor receiving said ATM cell streams carrying said broadband data and said narrowband data, said ATM processor assembling payload data units (PDU'S) from said ATM cell streams on the basis of said corresponding VPI/VCI, said ATM processor outputting PDU's carrying said broadband data on a first signal path and PDU's carrying said narrowband data on a second signal path;
- an in-band MPEG processor for processing said PDU's carrying said broadband data from said first signal path into a first MPEG stream of said broadband data, said first MPEG stream having PID values assigned on the basis of said corresponding VPI/VCI and routing information;
- an out-of-band MPEG processor for processing said PDU's carrying said narrowband data from said second signal path into a second MPEG stream of said narrowband data, said second MPEG stream being output on a downstream signaling channel corresponding to said user, and having PID values assigned, on the basis of said corresponding VPI/VCI and said routing information; and
- a transport multiplexer for outputting, in accordance with said corresponding VPI/VCI and said routing information, said first MPEG stream for modulation on a high-bandwidth channel selectable by said user.

43. An ATM demultiplexer as recited in claim 42, wherein said ATM processor outputs on a third signal path PDU's carrying a group of said broadband data transported by said ATM stream in MPEG format, said ATM processor recognizing said group of said broadband data on the basis of said corresponding VPI/VCI and said routing information, the ATM demultiplexer further comprising:
- a service processor for monitoring PID values of said broadband data in MPEG format on said third signal path, each of said broadband data streams in MPEG format output by said service processor having unique PID values; and
- means for correcting program reference clock timing in said broadband data streams in MPEG format on said third signal path; and
- means for encrypting said broadband data streams in MPEG format on said third signal path before multiplexing by said transport multiplexer.

44. An ATM demultiplexer as recited in claim 42, further comprising means for supplying low-bandwidth user data received on a low-bandwidth channel to said out-of-band MPEG processor, said out-of-band MPEG processor performing MPEG processing on said low-bandwidth user data and assigning a PID value on the basis of a user address corresponding to said low-bandwidth user data and said routing information.

45. A network for distributing programs and signaling information, comprising:
- an ATM processor, wherein: (1) the ATM processor receives first, second and third ATM cell streams identified by first, second and third VPI/VCI values, respectively, the first and second ATM cell streams containing program information, the third ATM cell stream containing signaling information; (2) the ATM processor converts data from ATM cells from the first, second and third ATM cell streams, into first, second and third streams of packets of data and applies at least a first packet identifier to the first stream of packets, a second packet identifier to the second stream of packets and a third packet identifier to the third stream of packets, the first, second and third packet identifiers corresponding respectively to the first, second and third VPI/VCI value; and (3) the ATM processor outputs the first and second streams of packets through a program output port and outputs the third stream of packets through a signaling output port;
- a first modulator for modulating the first and second streams of packets output through the program output port into a first channel signal;
- a second modulator for modulating the third stream of packets into a second channel signal;

means for broadcasting the first and second channel signals to a plurality of digital entertainment terminals capable of processing both program information and signaling information.

46. A network as in claim 45, wherein the ATM processor comprises a first input port receiving a multiplexed ATM cell stream containing both the first ATM cell stream and the second ATM cell stream.

47. A network as in claim 46, wherein the ATM processor further comprises a second input port receiving the third ATM cell stream.

48. A network as in claim 45, wherein the ATM processor comprises an input port receiving a multiplexed ATM cell stream containing the first, second and third ATM cell streams.

49. A network as in claim 45, wherein the means for broadcasting comprises:

a combiner combining the first channel signal and the second channel signal into a combined spectrum signal; and a distribution network transporting the combined spectrum signal to a group of the digital entertainment terminals.

50. A network as in claim 45, further comprising:

an ATM network;

first and second information providers transmitting the first and second ATM cell streams to the ATM processor through the ATM network; and at least one control element transmitting the third cell stream to the ATM processor through the ATM network.

51. A network as in claim 45, wherein the ATM processor comprises:

ATM processing means, receiving the ATM cell streams, for assembling payload data units (PDU'S) from said ATM cell streams on the basis of VPI/VCI values in each cell, and for outputting PDU's carrying program information on a first signal path and PDU's carrying signaling information data on a second signal path;

an in-band MPEG processor connected to the first signal path for processing the PDU's carrying the program information into a combined MPEG stream for transmission through the first output port, said combined MPEG stream having packets containing the first and second packet identifiers; and an out-of-band MPEG processor connected to the second signal path for processing said PDU's carrying the signaling information into an MPEG stream having packets containing the third packet identifier, for transmission through the second output port.

* * * * *